United States Patent [19]

Kishimoto

[11] Patent Number: 5,036,413
[45] Date of Patent: Jul. 30, 1991

[54] CASSETTE LOADING APPARATUS HAVING A SUPPLEMENTAL FORCE IMPARTING UNIT TO SUPPLY AN ASSIST FORCE TO SUPPLEMENT THE PRIMARY CASSETTE DRIVE FORCE DURING EJECTION TO URGE THE CASSETTE FROM A RECORD/REPRODUCE POSITION TO AN INTERMEDIATE POSITION DIRECTLY ABOVE

[75] Inventor: Yoshinobu Kishimoto, Takarazuka, Japan

[73] Assignee: Matsushita Electric Industrial Co., Ltd., Osaka, Japan

[21] Appl. No.: 371,832

[22] Filed: Jun. 27, 1989

[30] Foreign Application Priority Data

Jul. 1, 1988 [JP] Japan ............................ 63-165424
Jul. 1, 1988 [JP] Japan ............................ 63-165425
Jan. 27, 1989 [JP] Japan .............................. 1-17958

[51] Int. Cl.$^5$ .................. G11B 15/675; G11B 17/04; G11B 5/008
[52] U.S. Cl. ......................................... 360/96.5; 360/85
[58] Field of Search ................. 360/96.5, 85, 92, 96.6, 360/93

[56] References Cited

U.S. PATENT DOCUMENTS

| 4,631,607 | 12/1986 | Katsumato | 360/85 |
|---|---|---|---|
| 4,723,177 | 2/1988 | Ahn | 360/96.5 |
| 4,782,407 | 11/1988 | Hwang | 360/85 |
| 4,782,409 | 11/1988 | Hwang | 360/96.5 |
| 4,866,551 | 9/1989 | Kishimoto et al. | 360/96.5 |

FOREIGN PATENT DOCUMENTS

| 091808 | 10/1983 | European Pat. Off. |  |
|---|---|---|---|
| 0200905 | 11/1986 | European Pat. Off. | 360/96.5 |
| 59-72671 | 4/1984 | Japan |  |
| 59-151354 | 8/1984 | Japan |  |
| 59-191167 | 10/1984 | Japan |  |
| 0050969 | 3/1988 | Japan | 360/96.5 |
| 0102060 | 5/1988 | Japan | 360/96.5 |
| 00050967 | 3/1989 | Japan | 360/96.5 |

Primary Examiner—John H. Wolff
Assistant Examiner—Craig A. Renner
Attorney, Agent, or Firm—Stevens, Davis, Miller & Mosher

[57] ABSTRACT

A cassette loading apparatus used in a recording and reproducing apparatus is provided which includes a cassette holder releasably holding a cassette; side wall members having formed therein first and second guide grooves in which guide pins planted on both side walls of the cassette holder are movably inserted so that the cassette holder is reciprocated between a first position where the cassette can be loaded into and unloaded from the cassette holder and a second position where recording and reproduction can be effected, the second guide grooves extending continuously from one end of the first guide grooves orthogonally thereto; a cassette holder drive unit including a gear and a rotatable arm for moving the cassette holder from the first position to the second position or vice versa; and a supplemental force imparting unit provided on at least one of the side wall members for imparting an urging torque when the guide pins are shifted from the second guide grooves to the first guide grooves, so as to retard the travel speed of the cassette holder before arrival of the cassette holder at the second position.

9 Claims, 16 Drawing Sheets

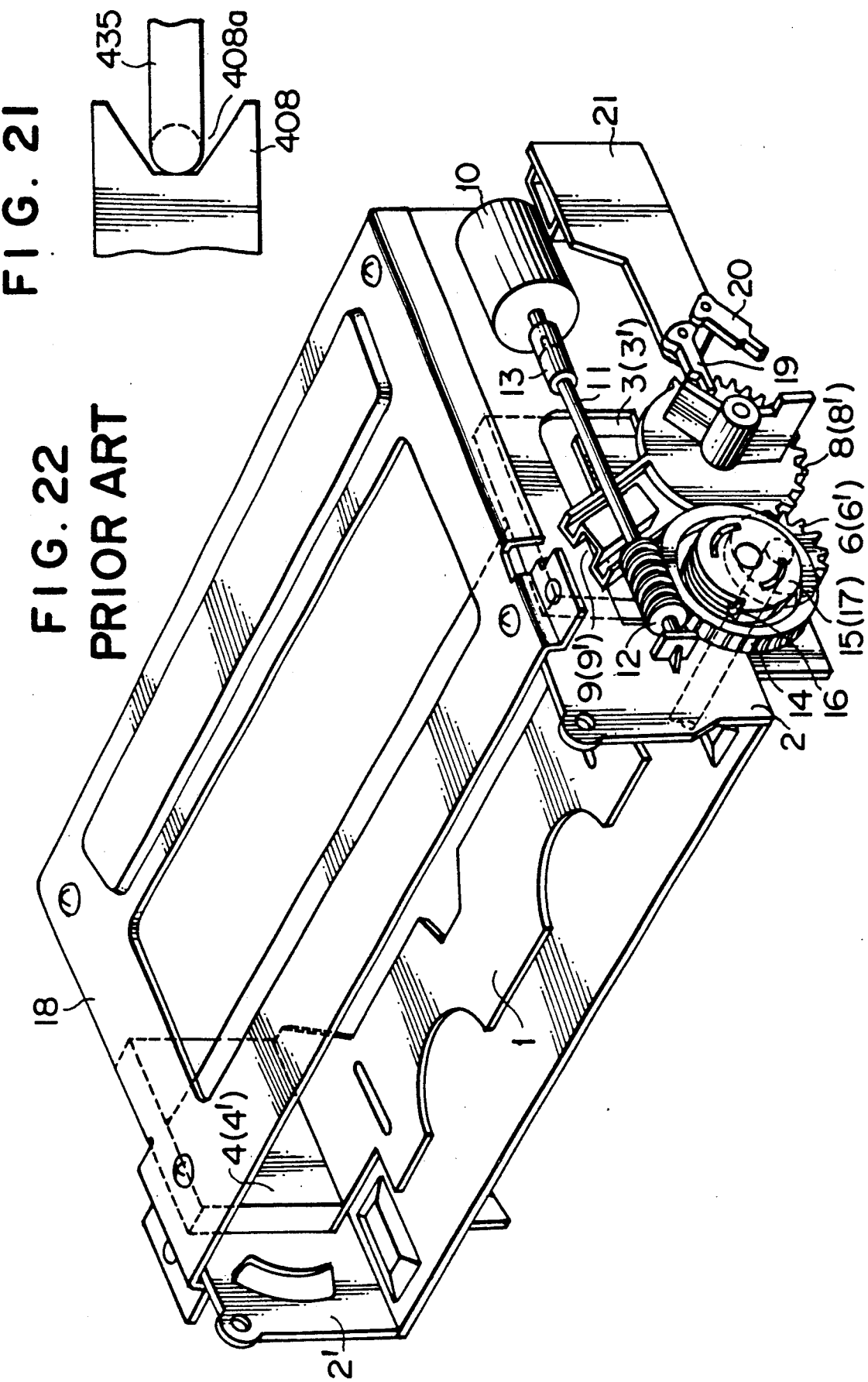

CASSETTE LOADING APPARATUS HAVING A SUPPLEMENTAL FORCE IMPARTING UNIT

FIELD OF THE INVENTION

The present invention relates to a cassette loading apparatus of front loading type for use in a cassette type magnetic recording and reproducing apparatus.

STATEMENT OF THE RELATED ART

In recent years, the cassette loading apparatus of front loading type in which a cassette is inserted from the front has been most commonly used in the cassette tape recording and reproducing apparatus such as a video tape recorder (hereinafter, referred to as VTR). An example of such cassette loading apparatus will be explained below with reference to the accompanying drawings.

FIG. 22 shows a construction of a conventional cassette loading apparatus.

In FIG. 22, a reference numeral 1 denotes a cassette holder for holding a cassette; 2 and 2', side plates disposed on both sides of the cassette holder 1; and 3 and 3', L-shaped guide grooves respectively formed in the side plates 2, 2', usually each being constituted by two or three grooves. Reference numerals 4 and 4' denote side wall members provided integrally on both sides of the cassette holder 1. Guide pins 5, 5' (see FIG. 25) engaged with the guide grooves 3, 3' formed in the side plates 2, 2' are provided on the side wall members 4, 4', respectively, in correspondence to the number of the guide grooves. Reference numerals 6 and 6' denote transmission gears which are connected to each other by a shaft 7 and rotatably supported by the side plates 2, 2', and numerals 8 and 8' denote rotatable drive arms which are respectively provided thereon with gears for meshing engagement with the transmission gear 6, 6' and are pivotally supported by the side plates 2, 2', respectively. Guide grooves 9, 9' formed in the forward ends of the drive arms 8, 8' are adapted to be engaged with the main guide pins 5, 5' provided on the side wall members 4, 4' of the cassette holder 1, respectively. A reference numeral 10 denotes a drive motor secured to the side plate 2, and a numeral 11 denotes a shaft which is formed integrally thereon with a worm 12 and is connected to an output shaft of the drive motor 10 through a coupling 13 while being rotatably supported by the side plate 2. A reference numeral 14 denotes a worm wheel which is brought into meshing engagement with the worm 12, and a numeral 15 denotes a clutch disc which is connected to the worm wheel 14 by means of a torsion coiled spring 16 so as to be rotatable with respect to each other while being rotatably supported by a shaft formed integrally on the side plate 2. The worm wheel 14 is rotatably fitted on the shaft sleeve portion of the clutch disc 15 and, further, a pinion 17 is fixedly process-fitted to the shaft sleeve portion of the clutch disc 15 so as to be united therewith while holding the worm wheel 14 between them. Further, the pinion 17 is brought into meshing engagement with the transmission gear 6. A reference numeral 18 denotes a top plate for interconnecting between the side plates 2, 2'. Reference numerals 19 and 20 denote switch elements attached to the side plate 2 through a metal fitting 21 for serving to detect the starting and finishing ends of the stroke of rotative movement of the drive arm 8, these switch elements usually having need of positional adjustment.

FIGS. 23 and 24 show details of the construction relating to the clutch disc 15. More specifically, the clutch disc 15 is formed therein with first engaging portions (hereinafter, referred to as elongated holes) 23, 23' of a crescent form in such a manner that they each extend over a predetermined angle and are arranged on a coaxial circle about an axial hole 22 in opposed relation to each other, and second engaging portions (hereinafter, referred to as projections) 24, 24' are formed integrally on the worm wheel 14 such as to be arranged in opposed relation to each other with respect to the center of the latter, the elongated holes 23, 23' being engaged with the projections 24, 24', respectively. Meanwhile, the spring 16 is engaged with the worm wheel 14 at its one end and with the clutch disc 15 at its other end so as to normally establish the positional relationship between the elongated holes 23, 23' and the projections 24, 24' as indicated by solid lines. Accordingly, the worm wheel 14 and the clutch disc 15 are allowed to rotate with respect to each other against the spring 16 by an amount corresponding to the difference between the opening angle α of the elongated hole 23, 23' and the width α' of the projection 24, 24', that is, α—α'. A reference numeral 17' denotes a partially-toothless gear formed integrally on the worm wheel 14. The construction such as shown in FIG. 23 takes aim at improving the operating ability and feeling of the user.

FIGS. 25 to 27 are views for explanation of the operation of the conventional apparatus described above. Referring to FIG. 25, it is designed that, before the motor 10 starts to rotate by the action of a switch upon the insertion of a cassette 25, or when the cassette 25 is inserted in the state that the power switch is turned off, only the transmission gear 6 kept in meshing engagement with the drive arm 8 engaged with the cassette holder 1 and the clutch disc 15 kept in meshing engagement with the transmission gear 6 are allowed to rotate relative to the worm wheel 14 held in its locked state within the range of α—α' mentioned above. For this reason, in the case that the power switch is turned on, as the cassette holder 1 holding the cassette 25 is slightly pushed into against the spring 16, the switch circuit is operated to cause the drive motor 10 to start rotating and, accordingly, the worm wheel 14 is made to rotate through the worm 12, so that the projection 24, 24' of the worm wheel 14 pushes the end surface of the elongated hole 23, 23' of the clutch disc 15. In consequence, the drive arms 8, 8' are rotated through the intermediary of the transmission gear 6 kept in meshing engagement with the pinion 17 provided integrally on the clutch disc 15 so that the cassette holder 1 which is provided integrally thereon with the guide pins 5, 5' engaged respectively with the guide grooves 9, 9' formed in the drive arms 8, 8' is caused to move horizontally and then vertically along the L-shaped guide grooves 3, 3' formed in the side plates 2, 2', thus completing the cassette loading operation.

On the other hand, in the case that the power switch is turned off, it is possible to push into the cassette holder 1 holding the cassette 25 against the spring 16 by a degree corresponding to the angle of rotation, α—α', mentioned above. Further pushing beyond that distance results in generation of a strong resistance as the reaction force since the worm wheel 14 is held in the locked state. Therefore, if the user removes his hand, the cassette holder 1 is returned to its original state by the force of the spring 16.

Next, referring to FIG. 26, in the case of the ejection mode after the cassette has been loaded, the drive motor 10 is rotated reversely but the mutual relation between the clutch disc 15 and the worm wheel 14 is such that the clutch disc 15 is pulled up by the worm wheel 14 through the spring 16. For this reason, since a load torque $M_1$ which is usually developed for vertically pulling up the cassette holder 1 holding the cassette 25 is applied from the drive arm 8 to the clutch disc 15 via the transmission gear 6 and the pinion 17, it is necessary that a set torque $M_2$ of the spring 16 is set to be larger than $M_1$. However, such large torque $M_2$ causes an extremely large reaction force to be developed until the drive motor 10 starts to rotate by the action of the switch upon the insertion of the cassette by the user and, hence, results in bad operating feeling, so that it is necessary to make the suitable setting of the spring. In addition, the moving range of the cassette holder 1 which corresponds to the angle of rotation, $\alpha-\alpha'$, of the drive arms 8, 8' is made to be set within the horizontal movement section. Further, if an overload is applied when the cassette holder 1 is vertically lifted for effecting the ejecting operation, the drive arms 8, 8' and hence the cassette holder 1 driven by the drive arms are brought into their locked states. In this case, after the worm wheel 14 alone is rotated against the spring 16 until the torque exerted by the spring 16 is made to be in equilibrium with the load torque or through the angular distance corresponding to the angle of rotation, $\alpha-\alpha'$, mentioned above, the clutch disc 15 and the follower members are at last allowed to start rotating. Although there is a premise that the motor torque is greater than the load torque, it cannot be expected, at all events, to effect the operations smoothly under such conditions. Accordingly, in order to solve the problems described above, there is known an arrangement in which, as shown in FIG. 27, the partially-toothless gear 17' formed integrally with the worm wheel 14 has the same diameter as the pinion 17 united with the clutch disc 15 such as to be brought into meshing engagement with the transmission gear 6 only when the cassette holder 1 is moved vertically, while being prevented from meshing therewith during the horizontal movement except the section corresponding to the above-described angle of rotation, $\alpha-\alpha'$. In the case of such arrangement, however, although it is not always necessary that the set torque $M_2$ of the spring 16 is greater than the load torque $M_1$ applied to the clutch disc, it is required that the cassette holder is surely returned to its regular position at the time of completing the ejecting operation and that, when the cassette is put in the cassette holder, the holder is prevented from easily moving before the cassette is completely held in the holder. Further, since it is necessary that the cassette holder holding the cassette surely makes the ejecting operation when the magnetic recording and reproducing apparatus is operated in the tilted state on the assembly line or for the repairing service or so, there is a limit in reduction of the set torque of the spring 16.

As described above, it is common, in general, that the conventional cassette loading apparatus is equipped with an expensive motor exclusively and, in addition, comprises reduction gears for attaining a suitable rotational speed of the drive arms, thus giving rise to a problem of high cost. Further, at the time of inserting the cassette, if the user continues to push in the cassette with this hand even after the drive motor starts to rotate by the action of the cassette-in switch, the worm wheel and the clutch disc are caused to rotate with their phases being deviated from each other as compared with the phases thereof prior to the insertion of the cassette, with the result that the teeth of the partially-toothless portion of the worm wheel are brought into meshing engagement with the gear of the drive arm while they are deviated in phase from the gear united with the clutch disc. Although the loading operation cannot be completed in that condition as a general rule, even if the loading operation can be completed, since the spring engaged with the clutch disc and the worm wheel is expanded, there still arises a problem that the cassette jumps out violently due to the reaction force of the spring at the time of ejecting operation.

OBJECT AND SUMMARY OF THE INVENTION

Accordingly, the present invention is devised in view of the above-mentioned problems inherent to the conventional cassette loading apparatus in a recording and reproducing apparatus.

A first object of the present invention is to provide a cassette loading apparatus in a recording and reproducing apparatus, which has a simple arrangement so that the manhours for assembly and cost thereof are greatly reduced, and in which the above-mentioned problem due to deviation in phase of meshing engagement between the drive arm and the rack during insertion of a cassette is eliminated so as to enable a series of cassette ejecting motions to be smoothly carried out and completed.

A second object of the present invention is to provide a cassette loading apparatus in a recording and reproducing apparatus which enables the travel speed of a cassette to be retarded just before a second position where recording and reproduction to and from the cassette can be effected during the cassette traveling from a first position where the loading and unloading of the cassette on and from a cassette holder can be effected to the second position, thereby to provide smooth and soft cassette loading and unloading operation.

To the end, according to the present invention, there is provided a cassette loading apparatus comprising: a cassette holder for releasably holding a cassette; side plates formed therein with first and second guide groove portions in which projections projectingly provided on both side walls of the cassette holder are movably inserted so that the cassette holder is guided so as to be allowed to reciprocate between a first position where the cassette tape can be loaded into and unloaded from the cassette holder and a second position where recording and reproduction to and from the cassette tape can be effected, the second guide groove portions extending continuously from one ends of the first guide groove portions orthogonally or substantially orthogonally thereto; drive means including rotatable drive arms for driving the projections so as to move the cassette holder from the first position to the second position or vice versa; clutch means including a power output member having a toothed portion formed in an area thereof which is kept in meshing engagement with a gear constituting the drive means so as to cause the drive arms to rotate through a predetermined angle and a first engaging portion provided at a portion thereof while being arranged such that the power therefrom is transmitted in a direction which is parallel or substantially parallel to the main surface portion of the side plate, and a power input member having a second engaging portion engaged with the first engaging portion of the power output member and movable in linked relation to the power output member through a first resilient member so as to receive the power from a driving source while being prevented from meshing with the gear; and supplementary force imparting means provided on at least one of the side plates for imparting a rotation urging force in the direction of rotation of the drive arms when the projections projectingly provided on the cassette holder are caused to shift from the second groove portions into the first guide groove portions, so as to supplement the turning force of the drive arms before arrival of the cassette holder at the first position.

Above and other features and objects of the present invention will be more apparent from the description of preferred embodiments of the present invention, which are explained hereinbelow in detail with reference to the accompanying drawings.

BRIEF DESCRIPTION OF THE DRAWINGS

FIG. 21 is a side view illustrating essential parts of an apparatus shown in FIG. 20;

FIG. 22 is a perspective view illustrating a conventional cassette loading apparatus;

DETAILED DESCRIPTION OF PREFERRED EMBODIMENTS

Description will be given below of a first embodiment of the present invention with reference to the drawings.

Figure 1:
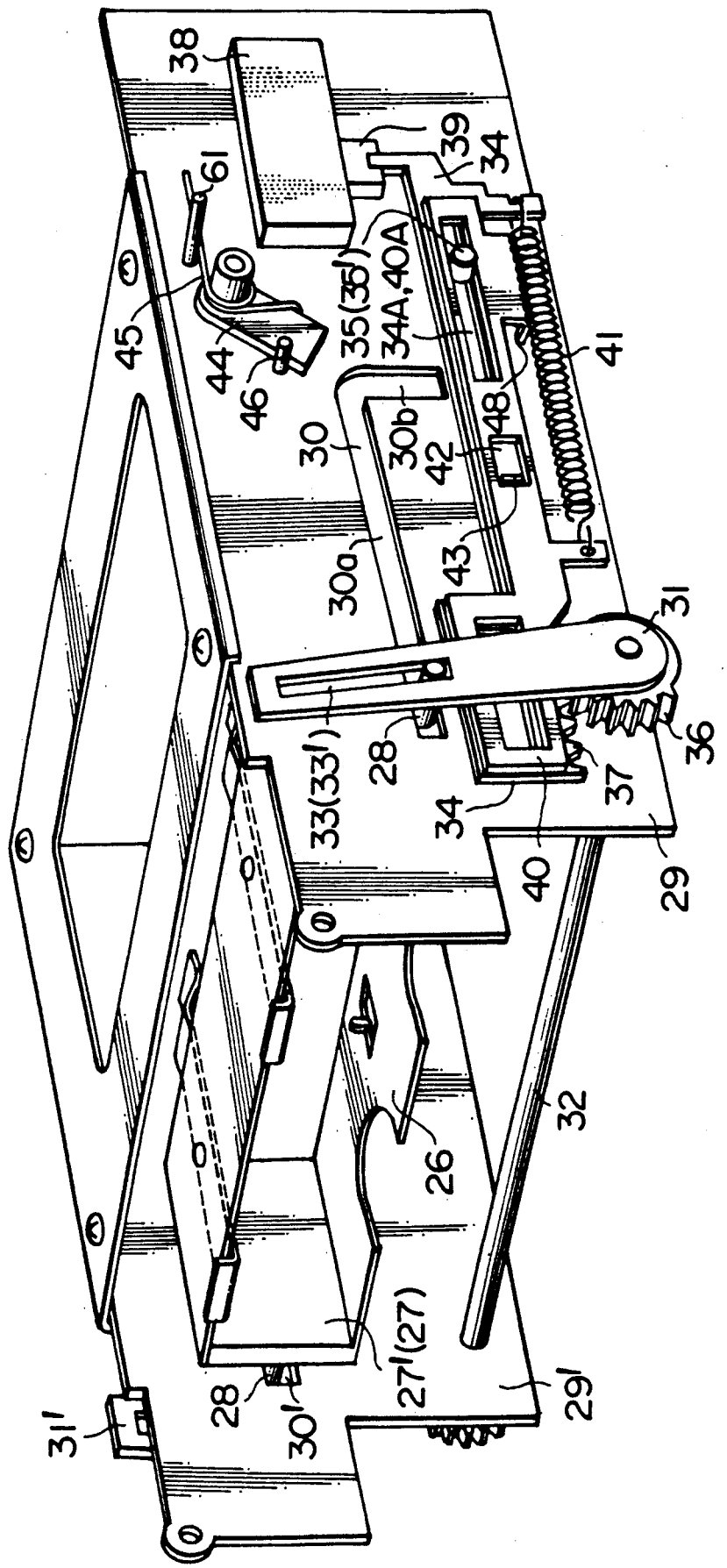
FIG. 1 is a perspective view illustrating a first embodiment of the present invention.

FIG. 1 shows the construction of a cassette loading apparatus in accordance with the first embodiment of the present invention.

In FIG. 1, a reference numeral 26 denotes a cassette holder; 27 and 27', side walls formed integrally on both sides of the cassette holder 26; 28 and 28', guide pins provided on the side walls 27, 27'; 29 and 29', side plates disposed on both sides of the cassette holder 26; and 30 and 30', L-shaped guide grooves formed in the side plates 29, 29' and engaged with the guide pins 28, 28', respectively, the L-shaped guide grooves each being constituted by two or three grooves. It is noted that the guide pins 28, 28' are provided in correspondence to the number of the guide grooves 30, 30'. Reference numerals 31 and 31' denote drive arms connected to each other by means of a shaft 32 and rotatably supported by the side plates 29, 29', guide grooves 33, 33' formed in the forward ends thereof being respectively engaged with the main guide pins 28, 28' provided on the side wall members 27, 27' of the cassette holder 26 described above. One of the drive arms 31, 31' is provided integrally thereon with a gear which is coaxial with the shaft 32. A reference numeral 34 denotes a first rack which is provided with a guide groove 34A so as to be horizontally movable owing to the engagement between the guide groove 34A and one of two guide pieces 35, 35' provided on the side plates 29, 29'. The first rack 34 has a toothed portion 37 having several teeth formed at one end thereof for the meshing engagement with the gear 36 provided integrally on the drive arm 31 and a bent projection formed at the other end thereof for engagement with an actuator 39 of a slide switch 38 secured to the side plate 29 or 29!. A reference numeral 40 denotes a second rack which is provided with a guide groove 40A, similarly to the first rack 34, such as to be horizontally movable owing to the engagement between the guide groove 40A and one of the guide pieces 35, 35' provided on the side plates 29, 29'. The first and second racks 34, 40 are connected to each other by means of a first resilient member 41, such as a tension spring, engaged with respective spring engaging portions of these racks. It is noted that the second rack 40 is provided with an engaging portion 42 in the shape of an elongated rectangular hole, and a projection 43, such as a bent portion, provided on the first rack 43 is fitted in the engaging portion 42 so that the phase of the guide grooves 34A, 40A both engaged with the guide piece 35 provided on the side plate 29 or 29' are normally made to coincide with each other in a position where the projection 43 and the engaging portion 42 are brought into contact with each other by means of the tension spring 41 and, moreover, the first and second racks 34, 40 are allowed to move in sliding motion relative to each other by a distance corresponding to the range of a space defined by the rectangular engaging portion 42 of the second rack 40 and the projection 43 of the first rack 34.

Reference numerals 44 and 44' denote control levers which are rotatably provided on the side plates 29, 29' and are coaxially provided thereon with second resilient members 45, 45', such as springs. Reference numerals 46, 46' denote lever stoppers for the control levers 44, 44′, which are projected from the side plates 29, 29′. Each of the second resilient members 45, 45′ is engaged at one end thereof with a stopper 61, 61′ projected from the side plate 29, 29′ and at the other end thereof with the control lever 44, 44′. Each of the control levers 44, 44′ is normally imparted with a rotation urging force in the direction toward the lever stopper 46, 46′ by means of the second resilient member 45, 45′. The control levers 44, 44′ and the second resilient members 45, 45′ constitute in combination supplementary force imparting means.

A reference numeral 47 (see FIG. 3) denotes an output gear which is provided on the main body of the magnetic recording and reproducing apparatus such as to be brought into meshing engagement with a toothed portion 48 formed at the L-shaped end of the second rack 40 when the cassette loading apparatus according to the present invention is mounted on the main body, with their phases being aligned with each other beforehand. It is noted that the toothed portion 48 of the second rack 40 is formed to extend over the same length as the range of the toothed section formed in the first rack 34 in the position where the toothed portion 48 is prevented from being meshed with the gear 36 provided integrally on the drive arm 31.

With the construction described above, the sequence of power transmission from the input to the output of power will be explained.

First, the output gear 47 is rotated to conduct power input and then the output gear 47 is brought into meshing engagement with the toothed portion 48 formed on the second rack 40 so as to move the second rack 40. The movement of the second rack 40 causes the projection 43 engaged with the engaging portion 42 to be pushed to thereby move the first rack 34, thus conducting power output. The movement of the first rack 34 causes the drive arm 31 kept in meshing engagement with the first rack 34 to rotate so that the cassette holder 26 engaged with the drive arm 31 through the intermediary of the guide pin 28 is allowed to move horizontally and vertically.

Generally, in a magnetic recording and reproducing apparatus, various driving sources are required for driving capstan, tape loading mechanism, reel bases and other like. However, from the viewpoint of requisite performance, cost and the like, various constructions have been put into practice such as one in which exclusive motors are used as the respective driving sources or a multi-functional single motor is used. Generally, in the case of using a multi-functional single motor, it is necessary to change the magnitude and direction of the output of the drive motor in regard to the respective functions by making use of various clutch mechanisms in which mechanical means, electric solenoids and other means are used in combination.

Figure 2:
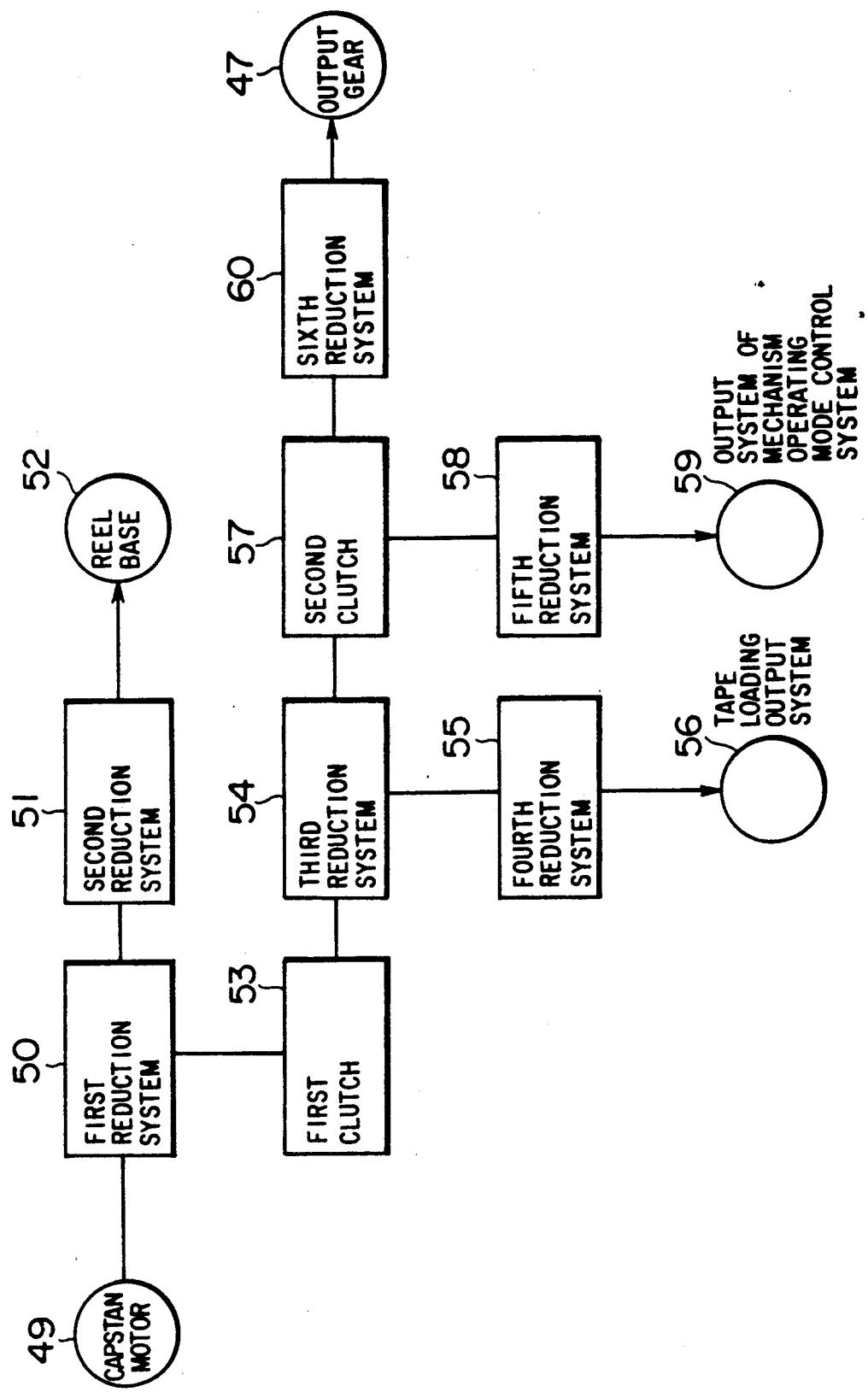
FIG. 2 is a block diagram for explanation of an apparatus shown in FIG. 1.

FIG. 2 is a block diagram showing an example of the drive system of the magnetic recording and reproducing apparatus according to the present embodiment. In the case of the present embodiment, operation of the whole apparatus except the cylinder is performed by a capstan motor alone. In FIG. 2, a reference numeral 49 denotes a direct-drive capstan motor; 50, a first reduction gear system; 51, a second reduction gear system; 52, a reel base; 53, a first clutch; 54, a third reduction gear system having a kind of clutch function; 55, a fourth reduction gear system; 56, an output system serving to perform the tape loading operation; 57, a second clutch; 58, a fifth reduction gear system; 59, an output system of a system serving to control the operation mode of the respective mechanism; 60, a sixth reduction gear system; and 47, the output gear connected to the cassette loading apparatus according to the present invention. It is noted that the first clutch 53 serves to change over the mode between the mode of cassette loading, tape loading and the like operations and the modes of tape traveling operation, and that, although not shown in the block diagram of FIG. 2, there is provided between the first and second reduction gear systems 50, 51 a mechanism which serves to selectively transmit or cut off rotation of the capstan motor in linked relation to the mechanism operation mode control system so that the rotation of the capstan motor is transmitted in the tape traveling operation mode.

Incidentally, although various other arrangements are applicable to the drive system described above, since the object of the present invention is not to improve the drive system itself but to use the driving source of the magnetic recording and reproducing apparatus without employing any drive motor exclusively for the cassette loading apparatus, detailed description of the drive system will be omitted.

FIGS. 3 to 7 are side views of essential parts of the cassette loading apparatus constructed as described above, for explanation of the operation thereof.

Figure 3:
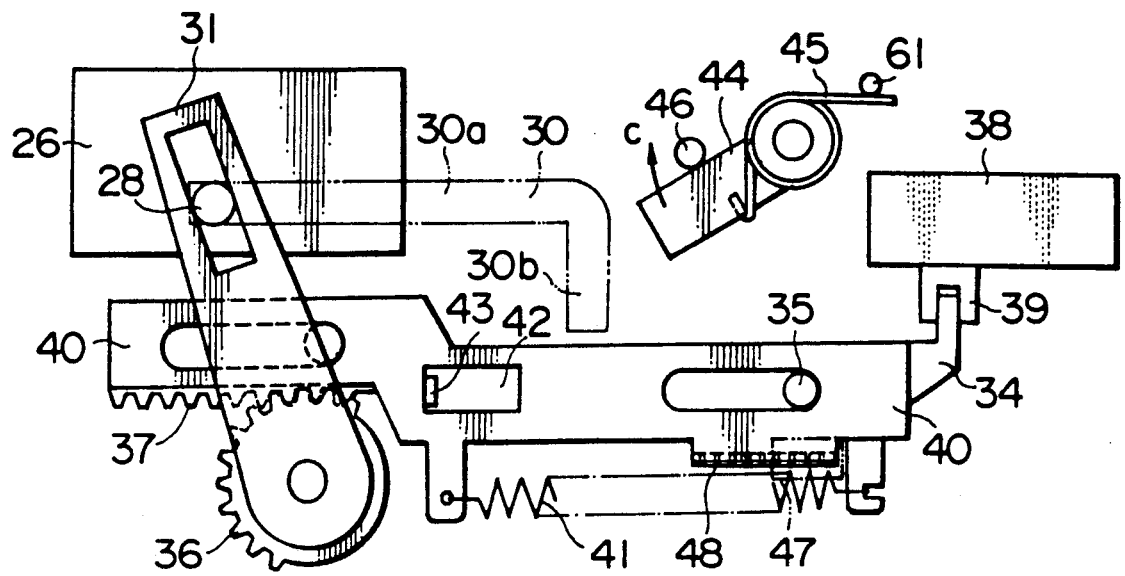
FIGS. 3 to 7 are side views illustrating essential parts of the apparatus shown in FIG. 1, for explaining the operation of the apparatus.
Figure 4:
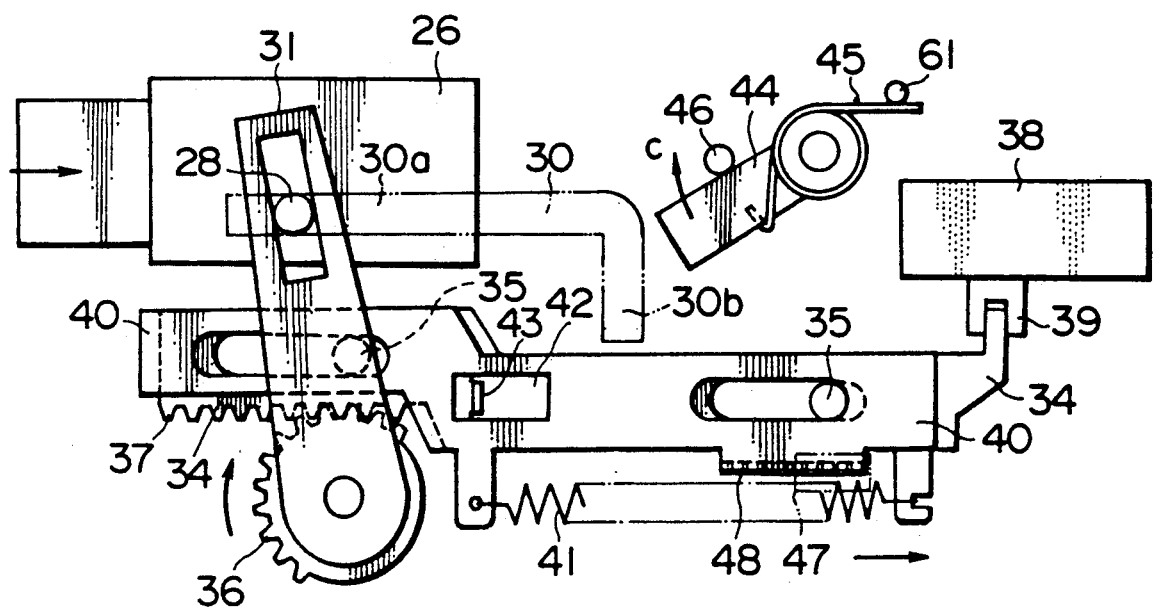

FIG. 3 shows a state prior to the insertion of the cassette, and FIG. 4 shows a state where the cassette holder holding the cassette is pushed in so that the cassette-in switch is about to be turned on to cause the drive motor to start rotation.

More specifically, the second rack 40 kept in meshing engagement with the output gear 47 is in its original position, while the first rack 34 having the toothed portion 37 which is kept in meshing engagement with the gear 36 provided integrally on the drive arm 31 is caused to move horizontally against the first resilient member 41.

Figure 5:
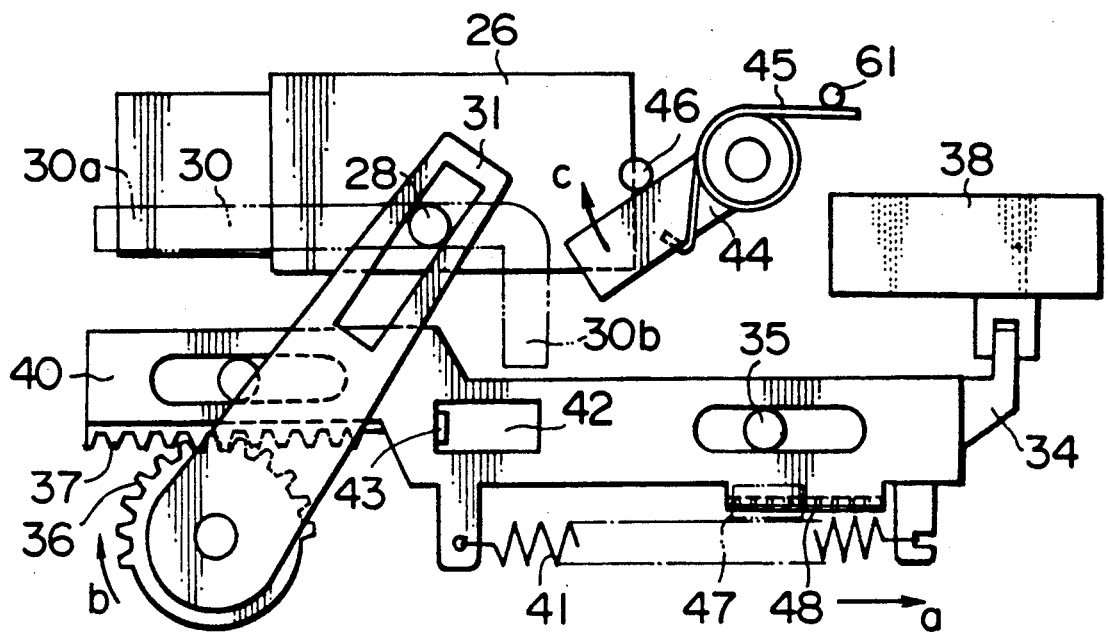

FIG. 5 shows a state where the cassette-in which is turned on to allow the cassette loading operation to be performed. The output gear 47 is rotated to cause the second rack 40 kept in meshing engagement with the output gear 47 to move horizontally in the direction of an arrow a while pushing the projection 43 of the first rack 43 by the engaging portion 42, so that the drive arm 31 kept in meshing engagement with the first rack 37 is caused to rotate in the direction of an arrow b, with the result that the cassette holder 26 engaged with the drive arms 31, 31′ through the intermediary of the guide pins 28, 28′ is allowed to move horizontally and vertically along the L-shaped guide grooves 30, 30′ provided in the side plates 29, 29′.

Figure 6:
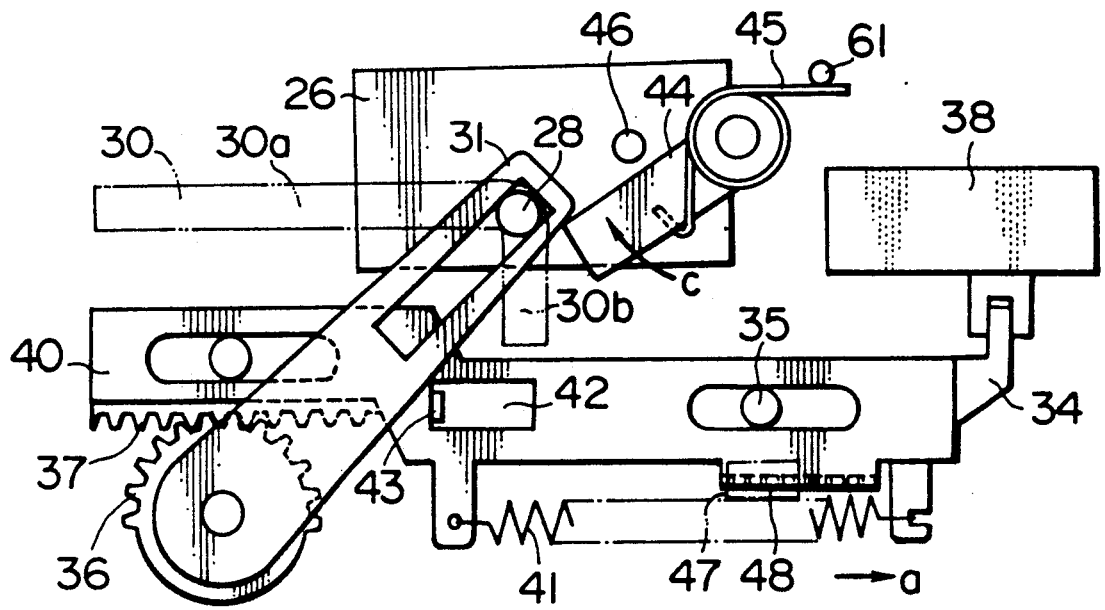
Figure 7:
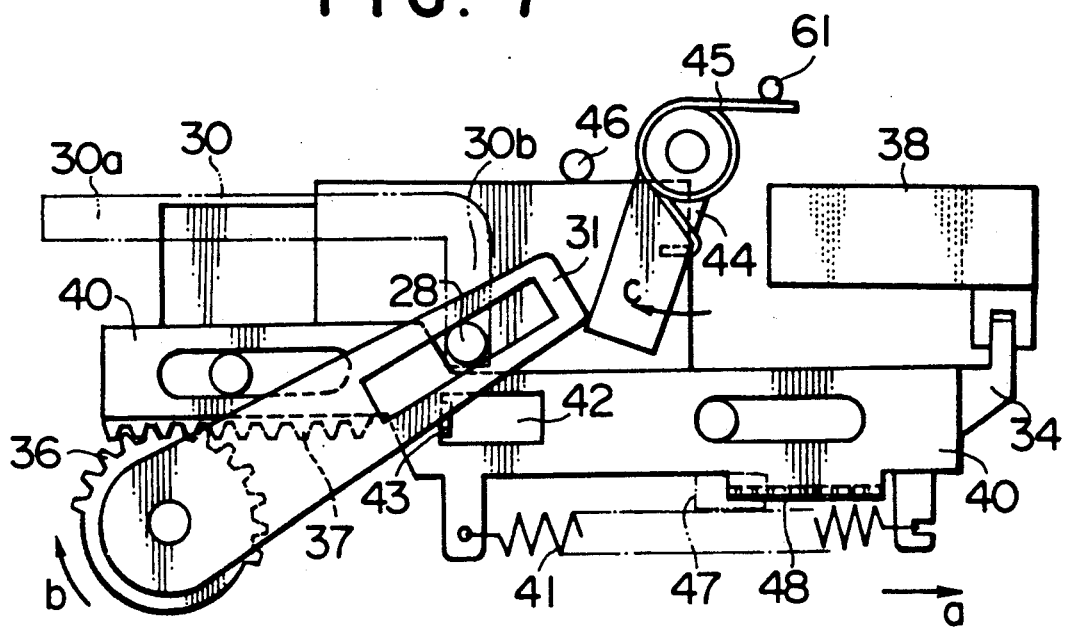

FIG. 6 shows a state where the guide pin 28 projected from the side wall 27 of the cassette holder 26 is about to be shifted from a first guide groove portion 30a into a second guide groove portion 30b formed in the side plate 29. In this case, the drive arm 31 has already come in slight contact with the control lever 44 so as to make the latter rotate. As the drive arm 31 causes the guide pin 28 to further move in the direction toward the second guide groove portion 30b (that is, toward a second position where recording and reproducing to and from the cassette can be effected), the control lever 44 is further rotated as well in linked relation to the drive arm 31. That condition is being kept till arrival at the second portion where the cassette is loaded as shown in FIG. 7. In this case, since the control lever 44 is imparted by the second resilient member 45 with a rotation urging force in the direction of an arrow c opposite to the direction of rotation of the drive arm 31, the moving speed of the cassette holder 26 is reduced before arrival at the second position.

Usually, when the guide pin 28, 28' of the cassette holder 26 is shifted from the first guide groove portion 30a into the second guide groove portion 30b, the weight of the cassette holder 26 containing the cassette, which has not been applied during the movement along the first guide groove portion 30a, is added in the direction toward the second position, with the result that, owing to the backlash of the gears of the driving means constituted by the drive arm 31, 31' and the like, the cassette holder 26 is moved (or rather dropped) abruptly toward the second position, thus making a loud noise. However, according to the present embodiment, since the control lever 44, 44' is imparted by the second resilient member 45, 45' with the rotation urging force in the direction opposite to the direction of rotation of the drive arm 31, 31' (as indicated by the arrow c), the moving speed of the cassette holder 26 is reduced before arrival at the second position, thus preventing the abrupt drop and, accordingly, reducing the noise level remarkably.

Next, description will be given of the operation in the case of ejecting the cassette.

As the drive motor starts to rotate in the state shown in FIG. 7, the output gear 47 is caused to rotate so that the second rack 40 kept in meshing engagement with the output gear 47 is moved horizontally in the direction opposite to the direction of the arrow a. The movement of the second rack 40 is transmitted to the first rack 34 through the tension spring 41 so that the first rack 34 is caused to move horizontally in the same direction as the second rack 40.

The drive arm 31 kept in meshing engagement with the first rack 34 is caused to rotate in the direction opposite to the direction of the arrow b, so that the cassette holder 26 engaged with the drive arm 31 through the intermediary of the guide pin 28 is moved vertically and then horizontally along the L-shaped guide grooves 30, 30' formed in the side plates 29, 29' until it arrives at the position shown in FIG. 3 where the cassette is ejected. As the force which acts to move the cassette holder 26 in the direction toward the first position, the rotation urging force produced by the second resilient member 45 constituting the supplementary force imparting means is exerted on the drive arm 31 through the control lever 44 in the direction of the arrow c so as to make the drive arm 31 rotate in the direction opposite to the direction of the arrow b, as already apparent from the description of the supplementary force imparting means in the case of inserting the cassette. Namely, the force which acts to move the cassette holder 26 in the direction toward the first position is a resultant force of the resilient forces of the first and second resilient members 41, 45.

The capstan motor 49 as the drive motor has the power enough to make the cassette holder 26 containing the cassette reciprocate between the first position where the cassette tape can be loaded into and unloaded from the cassette holder and the second position where recording and reproduction to and from the cassette tape can be effected. However, when the cassette holder 26 is moved from the second position to the first position, the first resilient member 41 plays the role of the clutch mechanism so as to prevent the cassette holder 26 from being transmitted with an excess force that is not required. In consequence, in the case that the cassette holder 26 is ejected by the action of the resilient force of the first resilient member 41 alone, the resilient force takes the very large value due to the presence of a considerable arm ratio between the gear portion 36 of the drive arm 31 and the guide pin 28 of the cassette holder 26, with the result that, on the occasion of loading the cassette, the cassette holder 26 must be inserted horizontally with a large force against the first resilient member 41, thus resulting in impracticability. In other words, the smaller the resilient force of the first resilient member 41, the more easily and practically the apparatus can be used.

However, if the resilient force is too small, the first resilient member 41 is incapable of generating the force which acts to move the cassette holder 26, while it does nothing but stretch. Namely, only the second rack 40 is moved in the direction opposite to the direction of the arrow a without causing the first rack 34 to move, thus making it impossible to move the cassette holder 26.

Figure 8:
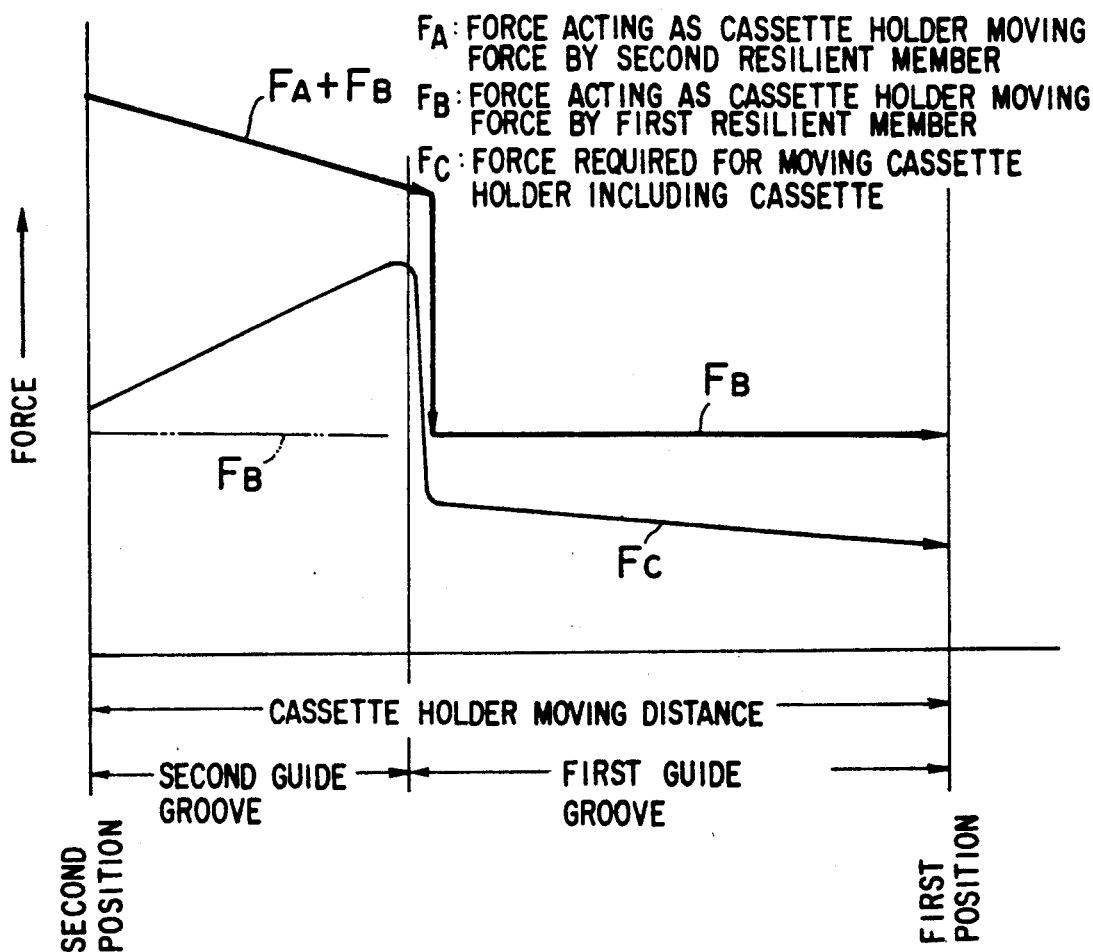
FIG. 8 is a chart showing the relationship between the moved distance of a cassette holder shown in FIG. 1 and various forces.

In the present embodiment, the resilient force of the first resilient member 41 is weakened to such an extent as not to hinder the insertion of the cassette holder 26, so that it is possible to move the cassette holder 26 by supplementing the resilient force of the second resilient member 45 to that of the first resilient member 41. Namely, as apparent from the relationship between the moved distance of the cassette holder and forces shown in FIG. 8, assuming that a force exerted on the cassette holder 26 by the second resilient member 45 constituting the supplementary force imparting means as the cassette holder moving force is $F_A$, a force exerted by the first resilient member 41 on the cassette holder 26 as the cassette holder moving force is $F_B$, and a load generated when the cassette holder 26 containing the cassette is moved from the second position toward the first position (or the force required for this movement) is $F_C$, the resilient forces of the first and second resilient members are determined such that the forces $F_A$, $F_B$ and $F_C$ satisfy an inequality of $F_C < F_A + F_B$ during the movement of the cassette holder, it is therefore possible to move the cassette holder 26 irrespective of position.

In the present embodiment, the section through which the force $F_A$ generated by the second resilient member is exerted is set to extend to the vicinity of the intermediate point between the first and second guide groove portions, and however, it is not limited to this one and may be set to extend to any desired point. For example, this section may be set to extend to the first position continuously so that the force $F_A$ is exerted throughout the whole section.

Further, FIGS. 6 and 7 show the states where, on the occasion of inserting the cassette, even if the cassette-in switch is actuated to commence the cassette loading operation, the user continues to further push in the cassette with his hand.

Referring to FIG. 6, the first and second racks 34, 40 are caused to move as they are relatively deviated from each other, but the second rack 40 is provided with no gear for meshing with the gear 36 provided on the drive arm 31.

Accordingly, there is no possibility of deviation in phase between the gear portions of the second rack 40 and the gear 36 in their meshed condition so that the horizontal movement is changed to the vertical movement and, at the time when the cassette loading operation is completed, the first and second racks 34, 40 are finally returned to the state in which their phases are made to coincide with each other similarly to the state prior to the insertion of the cassette, as shown in FIG. 7, since they are connected to each other by means of the first resilient member 41.

Description will be given of the power transmission path basically making reference to the shaft 32 which connects the drive arms 31, 31' to each other. In view of the fact that the power of the output gear 47 is transmitted to the gear 36 provided integrally on the drive arm 31 via the second rack 40 and then the first rack 34, it is understood that the drive arm 31 is disposed on the driving side while the other drive arm 31' which is transmitted with the power of the gear 36 through the shaft 32 is disposed on the driven side.

If the supplementary force imparting means is provided on the side of the drive arm 31', that is, on the driven side, a reaction force against the rotation urging force exerted by the supplementary force imparting means in the direction of the arrow c is applied to the shaft 32 through the drive arm 31' before and after arrival at the second position where the cassette is loaded, thereby increasing the torsional moment which the shaft 32 receives.

It is therefore necessary to enhance the rigidity of the shaft 32 such a by increasing the diameter thereof.

In view of the above, provision of the supplementary force imparting means merely on the side of the drive arm 31, that is, on the driving side, causes no change in the torsional moment of the shaft 32 so that it is possible to use the shaft having the same rigidity as the conventional ones. Further, in the case that there is some tolerance in the rigidity of the shaft, it is of course possible to make larger the rotation urging force of the supplementary force imparting means on the driving side than that on the driven side.

Now, description will be given of a second embodiment of the present invention with reference to the drawings.

Figure 9:
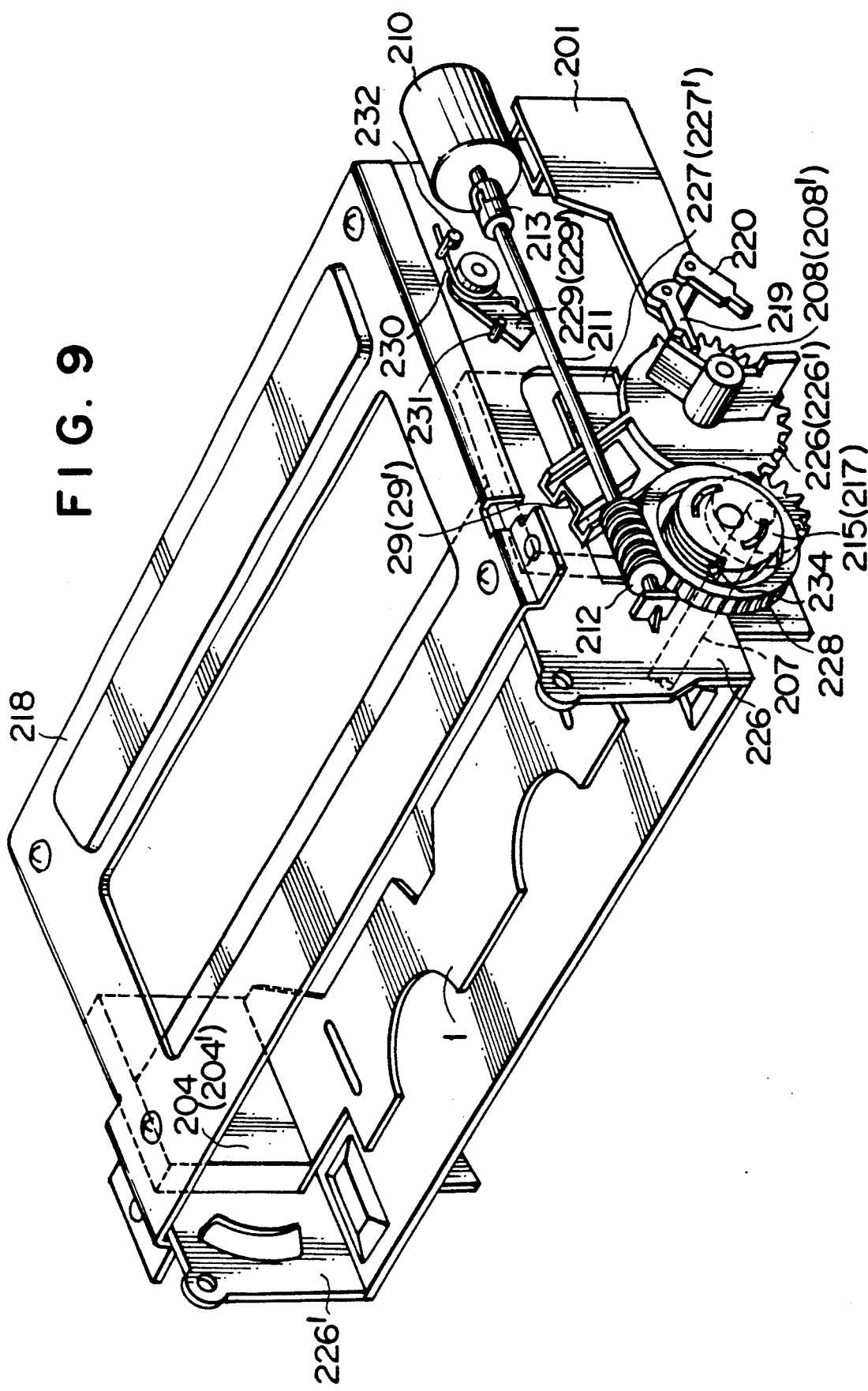
FIG. 9 is a perspective view illustrating a second embodiment of the present invention.

FIG. 9 shows the construction of a cassette loading apparatus in accordance with the second embodiment of the present invention.

In FIG. 9, a reference numeral 201 denotes a cassette holder for holding a cassette; 226 and 226', side plates disposed on both sides of the cassette holder 201; and 227 and 227', L-shaped guide grooves respectively formed in the side plates 226, 226', usually each being constituted by two or three grooves. Reference numerals 204 and 204' denote side wall members provided integrally on both sides of the cassette holder 201. Guide pins 205, 205' engaged with the guide grooves 227, 227' formed in the side plates 226, 226' are provided on the side wall members 204, 204', respectively, in correspondence to the number of the guide grooves. Reference numerals 206 and 206' denote transmission gears which are connected to each other by a shaft 207 and rotatably supported by the side plates 226, 226', and numerals 208 and 208' denote rotatable drive arms having the transmission gears 206, 206' as their constituents, which drive arms 208, 208' are respectively provided thereon with gears for meshing engagement with the transmission gears 206, 206' and are pivotally supported by the side plates 226, 226', respectively. Guide grooves 209, 209' formed in the forward ends of the drive arms 208, 208' are adapted to be engaged with the main guide pins 205, 205' provided on the side wall members 204, 204' of the cassette holder 201, respectively. A reference numeral 210 denotes a drive motor secured to the side plate 226, and a numeral 211 denotes a shaft which is formed integrally thereon with a worm 212 and is connected to an output shaft of the drive motor 210 through a coupling 213 while being rotatably supported by the side plate 226. A reference numeral 228 denotes a power input member (hereinafter, referred to as a worm wheel) which is brought into meshing engagement with the worm 212, an a numeral 215 denotes a clutch disc which is connected to the worm wheel 228 by means of a first resilient member 234 such as a torsion coiled spring so as to be rotatable with respect to each other while being rotatably supported by a shaft formed integrally on the side plate 226. The worm wheel 228 is rotatably fitted on the shaft sleeve portion of the clutch disc 215 and, further, a pinion 217 is press-fitted to the shaft sleeve portion of the clutch disc 215 so as to be united therewith while holding the worm wheel 228 between them. Further the pinion 217 is brought into meshing engagement with the transmission gear 206.

The pinion 27' and the clutch disc 215 constitute in combination a power output member, while the clutch means is constituted by the power output member and the power input member which includes the worm wheel 228 and the first resilient member 234.

Reference numerals 229 and 229' denote control levers which are rotatably provided on the side plates 226, 226' and are coaxially provided thereon with second resilient members 230, 230' such as spring. Reference numerals 231 and 231' denote lever stoppers for the control levers 229, 229', which are projectingly provided on the side plates 226, 226'. Each of the second resilient members 230, 230' is engaged at one end thereof with a stopper 232, 232' projected from the side plate 226, 226' and at the other end thereof with the control lever 229, 229'. Each of the control levers 229, 229' is normally imparted with a rotation urging force in the direction toward the lever stopper 231, 231' by means of the second resilient member 230, 230'. The control levers 229, 229' and the second resilient members 230, 230' constitute in combination supplementary force imparting means.

Figure 10:
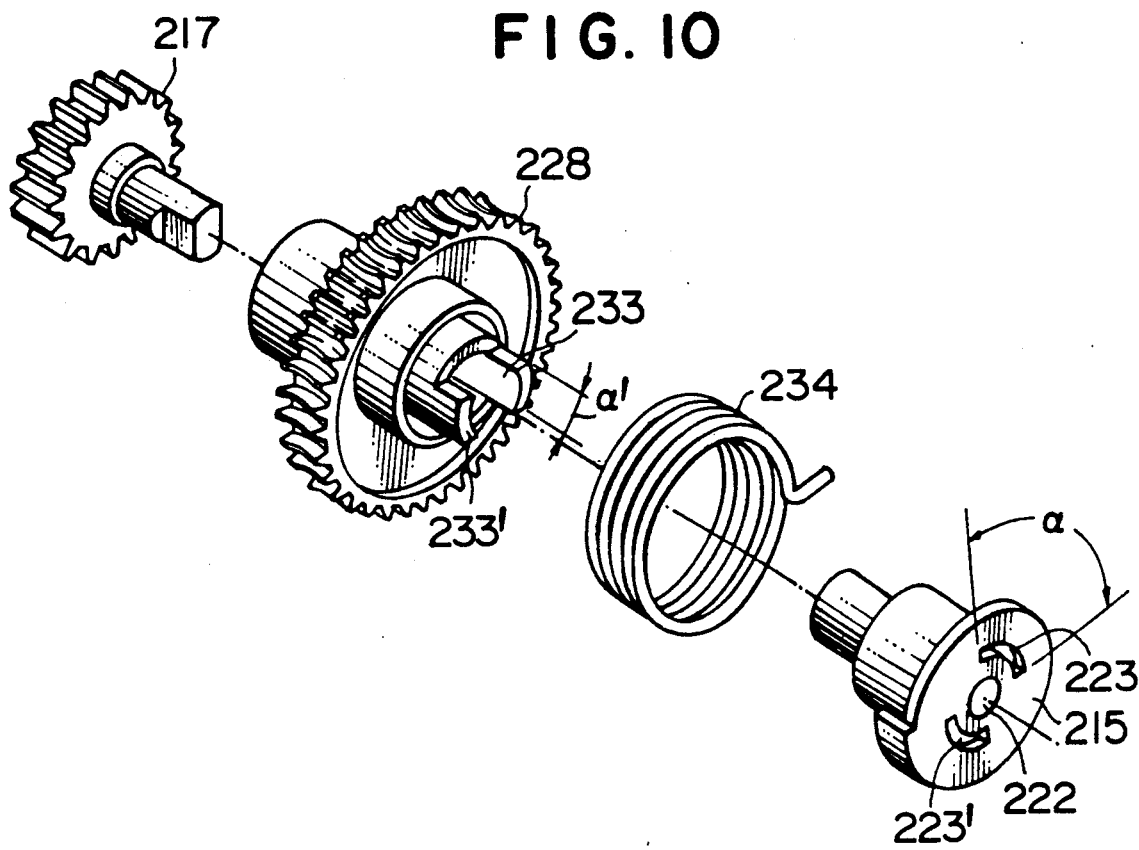
FIGS. 10 and 11 are perspective views illustrating essential parts of an apparatus shown in FIG. 9, the parts being exploded in FIG. 10 but assembled in FIG. 11.
Figure 11:
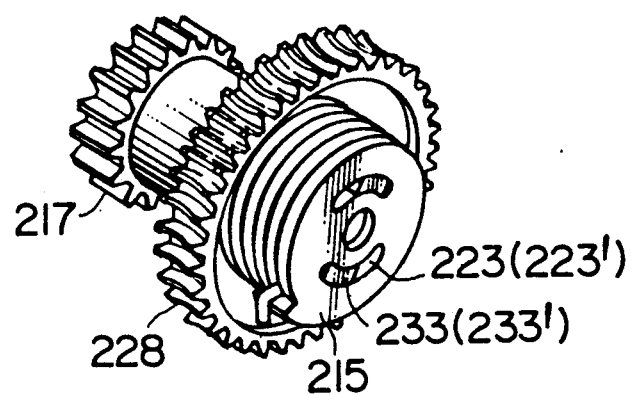

FIGS. 10 and 11 are detail drawings of the clutch means. More specifically, the clutch disc 215 is formed therein with first engaging portions (hereinafter, referred to as elongated holes) 223, 223' in a crescent form in such a manner that they each extend over a predetermined angle and are arranged on a coaxial circle about an axial hole 222 in opposed relation to each other, and second engaging portions (hereinafter, referred to as projections) 233, 233' are formed integrally on the worm wheel 228 such as to be arranged in opposed relation to each other with respect to the center of the latter, the elongated holes 223, 223' being engaged with the projections 233, 233', respectively. Meanwhile, the first resilient member 234 is engaged with the worm wheel 223 at its one end and with the clutch disc 215 at its other end so as to normally establish the positional relationship between the elongated holes 223, 223' and the projections 233, 233' as indicated by solid lines. Accordingly, the worm wheel 228 and the clutch disc 215 are allowed to rotate with respect to each other against the first resilient member 234 by an amount corresponding to the difference between the opening angle o of the elongated hole 223, 223' and the width $\alpha'$ of the projection 233, 233', that is, $\alpha - \alpha'$. The construction such as shown in FIG. 10 takes aim at improving the operating ability and feeling of the user.

Figure 12:
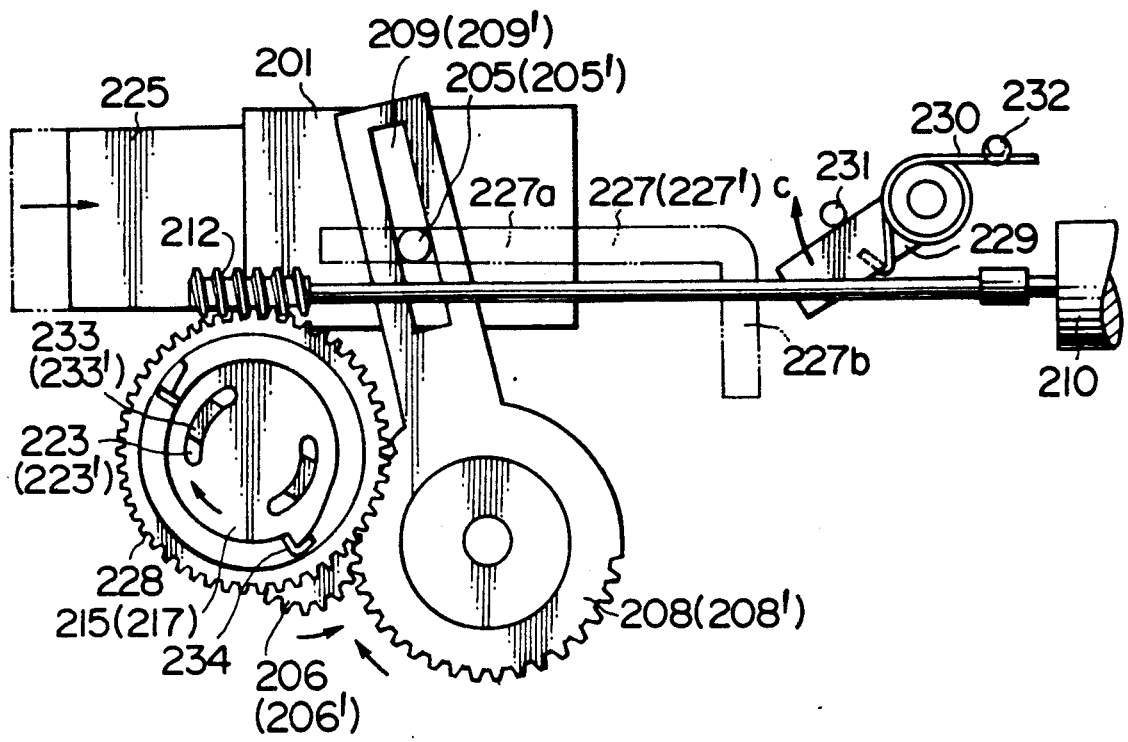
FIGS. 12 to 14 are side views illustrating essential parts of the apparatus shown in FIG. 9, for explaining the operation of the apparatus.
Figure 13:
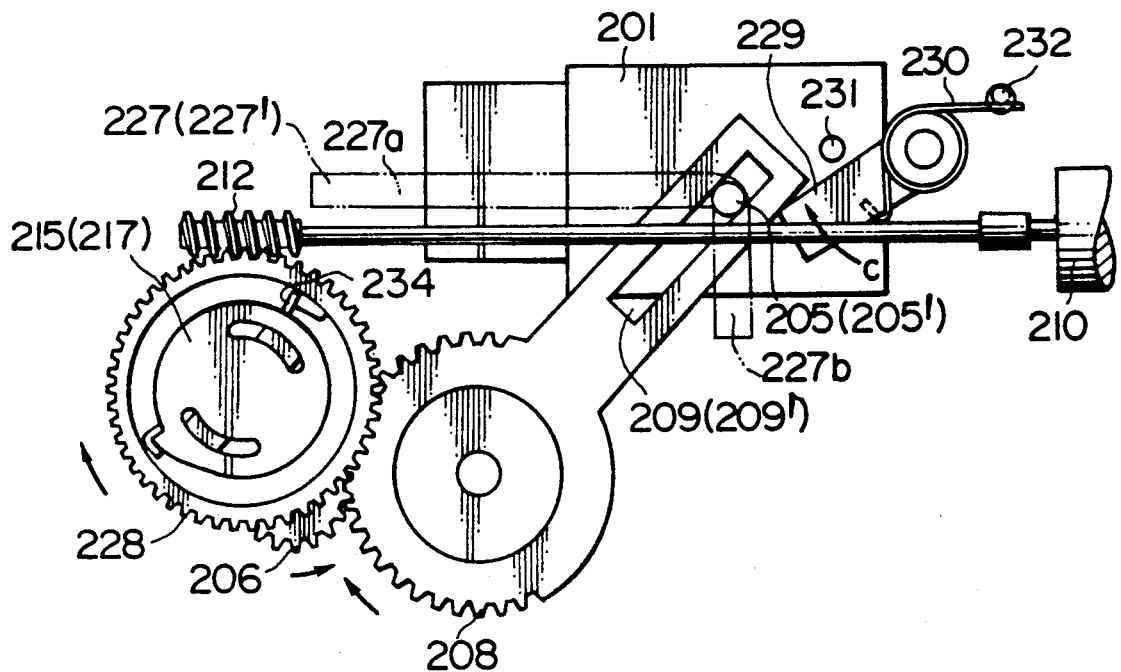
Figure 14:
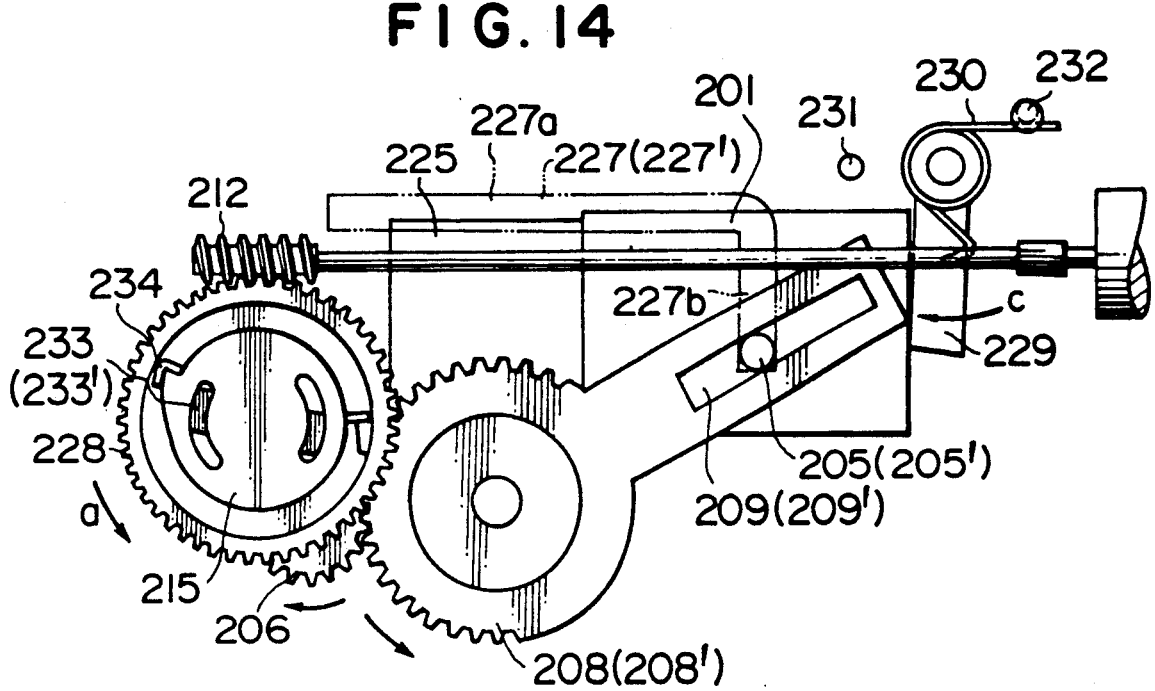

FIGS. 12 to 14 are views for explanation of the operation of the present embodiment of the invention described above. Referring to FIG. 12, it is designed that, before the motor 210 starts to rotate by the action of a switch upon the insertion of a cassette 225, or when the cassette 225 is inserted in the state that the power switch is turned off, only the transmission gear 206 kept in meshing engagement with the drive arm 208 engaged with the cassette holder 201 and the clutch disc 215 press-fitted to the pinion 217 kept in meshing engagement with the transmission gear 206 are allowed to rotate relative to the worm wheel 228 held in its located state within the range of α—α' mentioned above. For this reason, in the case that the power switch is turned on, as the cassette holder 201 holding the cassette 225 is slightly pushed into against the first resilient member 234, the switch circuit is operated to cause the drive motor 210 to start rotating and, accordingly, the worm wheel 228 is made to rotate through the worm 212, so that the projection 233, 233' of the worm wheel 228 is caused to push the end surface of the elongated hole 223, 223' of the clutch disc 215. In consequence, the drive arms 208, 208' are rotated through the intermediary of the transmission gear 206 kept in meshing engagement with the pinion 217 provided integrally on the clutch disc 215 constituting the power output member, so that the cassette holder 201 which is provided integrally thereon with the guide pins 205, 205' engaged respectively with the guide grooves 209, 209' formed in the drive arms 208, 208' is caused to move horizontally and then vertically along the L-shaped guide grooves 227, 227' formed in the side plates 226, 226', thus completing the cassette loading operation.

On the other hand, in the case that the power switch is turned off, it is possible to push into the cassette holder 201 holding the cassette 225 against the first resilient member 234 by a distance of the section corresponding to the angle of rotation, α—α', mentioned above. Further pushing beyond that distance results in generation of a strong resistance as the reaction force since the worm wheel 228 is held in the locked state. Therefore, if the user removes his hand, the cassette holder 201 is returned to its original state by the force of the first resilient member 234.

FIG. 13 shows a state where the guide pin 205 projected from the side wall member 204 of the cassette holder 201 is about to be shifted from a first guide groove portion 227a into a second guide groove portion 227b formed in the side plate 226. In this case, the drive arm 208 has already come in slight contact with the control lever 229. As the guide pin 205 is further moved in the direction toward the second guide groove portion 227b (that is, toward a second position where recording and reproduction to and from the cassette can be effected), the drive arm 208 causes the control lever 229 to rotate in contact relation to each other, which condition is being kept till arrival at the second position where the cassette is loaded as shown in FIG. 14. In this case, since the control lever 229 is imparted by the second resilient member 230 with a rotation urging force in the direction of an arrow c opposite to the direction of rotation of the drive arm 208, the moving speed of the cassette holder 201 is reduced before arrival at the second position.

Usually, when the guide pin 205, 205' of the cassette holder 201 is shifted from the first guide groove portion 227a into the second guide groove portion 227b, the weight of the cassette holder 201 containing the cassette, which has not been applied during the movement along the first guide groove portion 227a, is added in the direction toward the second position of the cassette, with the result that, owing to the backlash of the gears of the driving means constituted by the drive arm 208, 208' and the like, the cassette holder 201 is moved (or rather dropped) abruptly toward the second position of the cassette, thus making a loud noise. However, according to the present embodiment, since the control lever 229, 229' is imparted by the second resilient member 230, 230' with the rotation urging force in the direction opposite to the direction of rotation of the drive arm 208, 208' (as indicated by the arrow c), the moving speed of the cassette holder 201 is reduced before arrival at the second position, thus preventing the abrupt drop and, accordingly, reducing the noise level remarkably.

Next, description will be given of the operation in the case of ejecting the cassette.

As the drive motor 210 starts to rotate in the state shown in FIG. 14, the worm wheel 228 as the power input member which is kept in meshing engagement with the worm 212 is caused to rotate in the direction of the arrow a. The turning force of the worm wheel 228 is transmitted through the first resilient member 234 to the clutch disc 215 and the pinion 217 which constitute in combination the power output member so as to make them rotate in the same direction as the worm wheel 228.

The drive arm 208 kept in meshing engagement with the pinion 217 through the transmission gear 206 is caused to rotate in the same direction a indicated by the arrow a, so that the cassette holder 201 engaged with the drive arm 208 through the intermediary of the guide pin 205 is moved vertically and then horizontally along the L-shaped guide grooves 227, 227' formed in the side plates 226, 226' until it arrives at the position shown in FIG. 12 and, further, at the first position of the cassette holder 201. As the force which acts to move the cassette holder 201 in the direction toward the first position, the rotation urging force produced by the second resilient member 230 constituting the supplementary force imparting means is exerted on the drive arm 208 through the control lever 229 in the direction of the arrow c so as to make the drive arm 208 rotate in the same direction as indicated by the arrow a, as already apparent from the description of the supplementary force imparting means in the case of inserting the cassette. Namely, the force which acts to move the cassette holder 201 in the direction toward the first position is a resultant force of the resilient forces of the first and second resilient members 234, 230.

The drive motor 210 has sufficient power to make the cassette holder 201 containing the cassette reciprocate between the first position where the cassette tape can be loaded into and unloaded from the cassette holder and the second position where recording and reproduction to and from the cassette tape can be effected. However, when the cassette holder 201 is moved from the second position to the first position, the first resilient member 234 plays the role of the clutch mechanism so as to prevent the cassette holder 201 from being transmitted with an excess force. In consequence, if the cassette holder 201 is ejected by the action of the resilient force of the first resilient member 234 alone, a resilient force takes the very large value due to the presence of a considerable arm ratio between the gear portion of the drive arm 208 and the guide pin 205 of the cassette holder 201, with the result that, on the occasion of loading the cassette, the cassette holder 201 must be inserted horizontally with a large force against the first resilient member 234, thus resulting in impracticability. In other words, the smaller the resilient force of the first resilient member 234, the more easily and practically the apparatus can be used.

However, if the resilient force is too small, the first resilient member 23 is incapable of generating the force which acts to move the cassette holder 201, while it does nothing but stretch. Namely, only the worm wheel 228 is moved in the direction of the arrow a without causing the power output member to move, so that the power is not transmitted to the drive arm 208 to thereby make it impossible to move the cassette holder 201.

Figure 15:
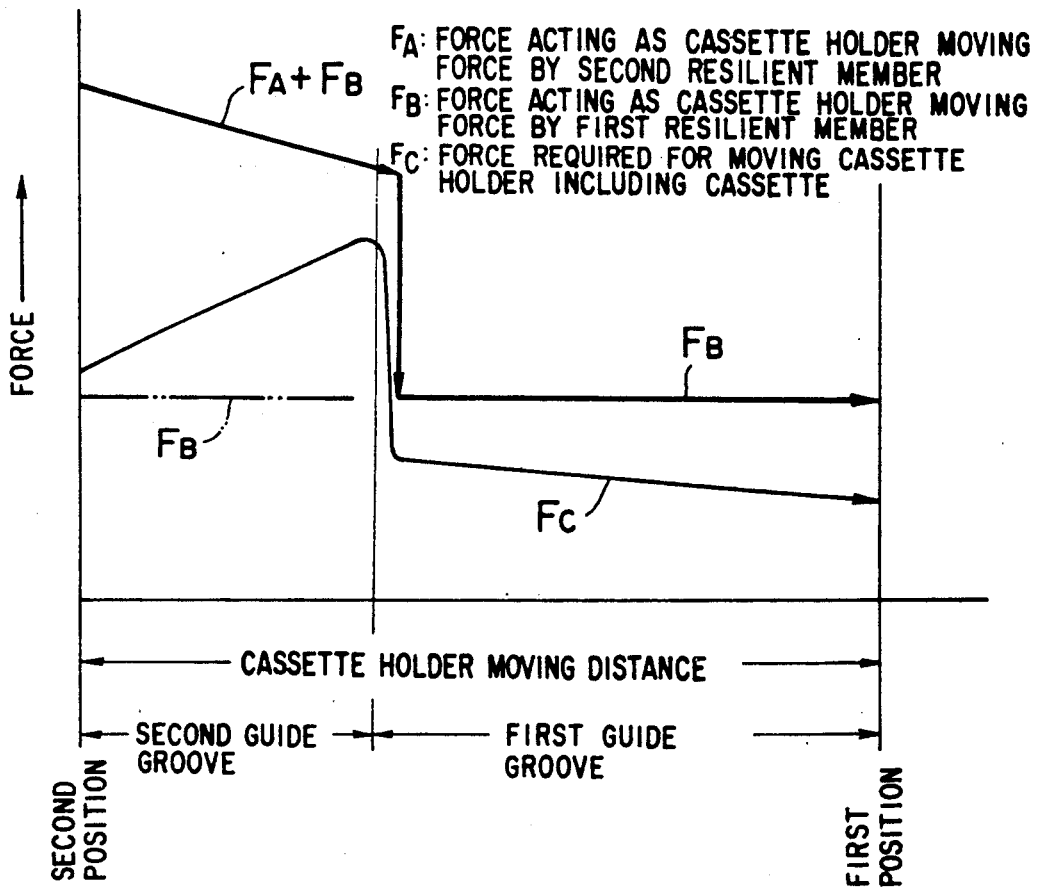
FIG. 15 is a chart showing the relationship between the moved distance of a cassette holder shown in FIG. 9 and various forces.

In the present embodiment, the resilient force of the first resilient member 234 is weakened to such an extent as not to hinder the insertion of the cassette holder 201, so that it is possible to move the cassette holder 201 by supplementing the resilient force of the second resilient member 230 to that of the first resilient member 234. Namely, as apparent from the relationship between the moved distance of the cassette holder and forces shown in FIG. 15, assuming that a force exerted on the cassette holder 201 by the second resilient member 230 constituting the supplementary force imparting means as the cassette holder moving force is $F_A$, a force exerted by the first resilient member 234 on the cassette holder 201 as the cassette holder moving force is $F_B$, and a load generated when the cassette holder 201 containing the cassette is moved from the second position toward the first position (or the force required for this movement) is $F_C$, the resilient forces of the first and second resilient members are determined such that the forces $F_A$, $F_B$ and $F_C$ satisfy an inequality of $F_C < F_A + F_B$ during the movement of the cassette holder. It is therefore possible to move the cassette holder 201 irrespective of position.

In the present embodiment, the section through which the force $F_A$ generated by the second resilient member is exerted is set to extend to the vicinity of the intermediate point between the first and second guide groove portions, and however, it is not limited to this one and may be set to extend to any desired point. For example, this section may be set to extend to the first position continuously so that the force $F_A$ is exerted throughout the whole section.

Further, FIGS. 13 and 14 show the state where, on the occasion of inserting the cassette, even if the cassette-in switch is actuated to commence the cassette the cassette with his hand.

Referring to FIG. 13, the worm wheel 228 and the pinion 217 constituting a part of the power output member are caused to move as they are relatively deviated from each other, but the worm wheel 228 is provided with no gear for meshing with the transmission gear 206 which kept in meshing engagement with the gear provided on the drive arm 208.

Accordingly, there is no possibility of deviation in phase between the gear portions of the worm wheel 228 and the power output member in their meshed condition so that the horizontal movement is changed into the vertical movement and, at the time when the cassette loading operation is completed, the power output member and the power input member are finally returned to the state in which their phases are made to coincide with each other similarly to the state prior to the insertion of the cassette, as shown in FIG. 14, since they are connected to each other by means of the first resilient member 234.

Now, description will be given of a third embodiment of the present invention with reference to the drawings.

Figure 16:
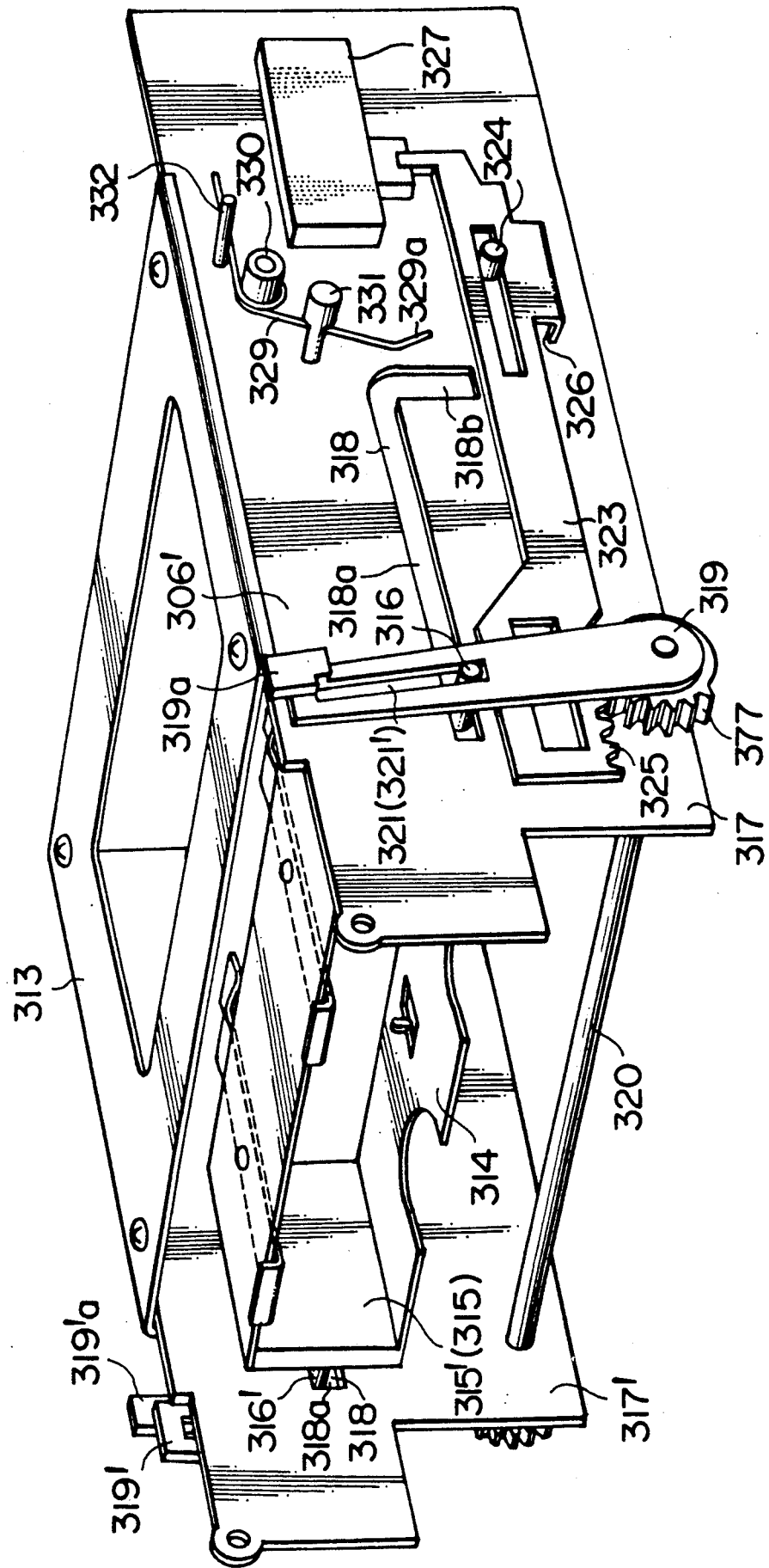
FIG. 16 is a perspective view illustrating a third embodiment of the present invention.

FIG. 16 shows the construction of a cassette loading apparatus in accordance with the third embodiment of the present invention. In FIG. 16, a reference numeral 314 denotes a cassette holder; 315 and 315', side walls formed integrally on both sides of the cassette holder 314; 316 and 316', guide pins projectingly provided on the side walls 315, 315'; 317 and 317', side wall members disposed on both sides of the cassette holder 314; and 318, 318', guide grooves formed in the side wall members 317, 317' and respectively engaged with the guide pins 316, 316', each guide groove having a first guide groove portion 318a and a second guide groove portion 318b extending continuously from one end of the first guide groove portion orthogonally or substantially orthogonally thereto and being constituted by two or three grooves. It is noted that the guide pins 316, 316' are provided in correspondence to the number of the guide grooves 318, 318'. Reference numerals 319 and 319' denote drive arms connected to each other by means of a shaft 320 and rotatably supported by the side wall members 317, 317', guide grooves 321, 321' formed in the forward ends thereof being respectively engaged with the main guide pins 316, 316' provided on the side walls 315, 315' of the cassette holder 314. One of the drive arms 319 and 319' is provided integrally thereon with a gear 322 which is coaxial with the shaft 320. A reference numeral 323 denotes a rack which is provided with a rack guide groove such as to be horizontally movable through the engagement between the rack guide groove and one of two guide pieces 324, 324' provided on the side wall members 317, 317'. The rack 323 has a toothed portion 325 having several teeth formed at one end thereof for the meshing engagement with the gear 322 and another toothed portion 326 having the same number of teeth as the toothed portion 325 formed at the L-shaped other end thereof in such an area that is prevented from being brought into meshing engagement with the gear 322 provided integrally on the drive arm 319 or 319'.

A reference numeral 327 denotes a switch element which is linked to the rack 323 and serves to detect the starting and finishing ends of the stroke of movement of the rack 323. The main body of the switch is secured to the side wall member 317 or 317'. A reference numeral 328 (see FIG. 17) denotes an output gear which is provided on the main body of the magnetic recording and reproducing apparatus such as to be brought into meshing engagement with the toothed portion 326 formed on the rack 323 when the cassette loading apparatus according to the present invention is mounted on the main body of the magnetic recording and reproducing apparatus, with their phases being aligned with each other beforehand. The drive arms 319, 319', the shaft 320, the rack 323, the switch element 327 and the holder driving gear 328 constitute in combination the cassette holder driving means.

Reference numerals 329, 329' denote resilient members mounted on shaft portions 330, 330' which are projected from the side wall members 317, 317'. Reference numerals 331 and 331' denote first stoppers for one end of the resilient members 329, 329', which stoppers are projectingly provided on the side wall member 317, 317'. The other end of the resilient members 329, 329' is engaged with second stoppers projected from the side wall members 317, 317'. The resilient members 329, 329' are normally imparted with a rotation urging force in the direction toward the first stoppers 331, 331'.

Reference numerals 329a and 329a' denote bent portions extending continuously from the resilient members 329, 329' so as to prevent the end surfaces of the resilient members 329, 329' from coming in contact with the drive arms 319, 319'.

Reference numerals 319a and 319a' denote guide members provided integrally on the drive arms 319, 319'.

Figure 17:
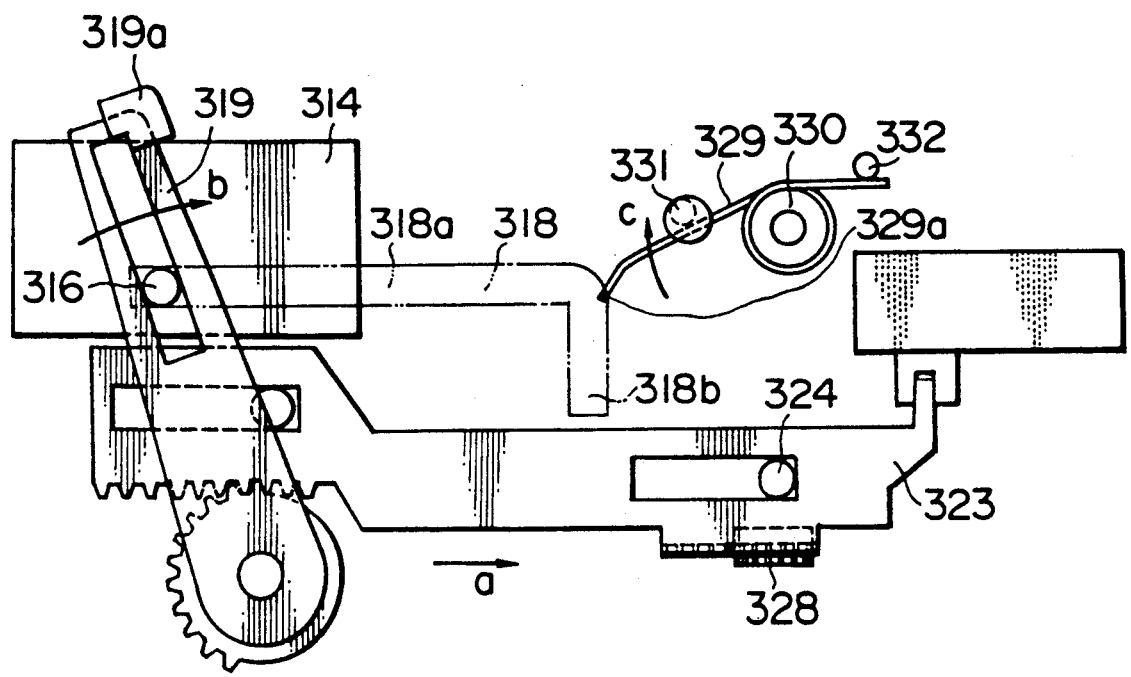
FIGS. 17 through 19 are side views illustrating essential parts of an apparatus shown in FIG. 16, for explaining the operation of the apparatus.
Figure 18:
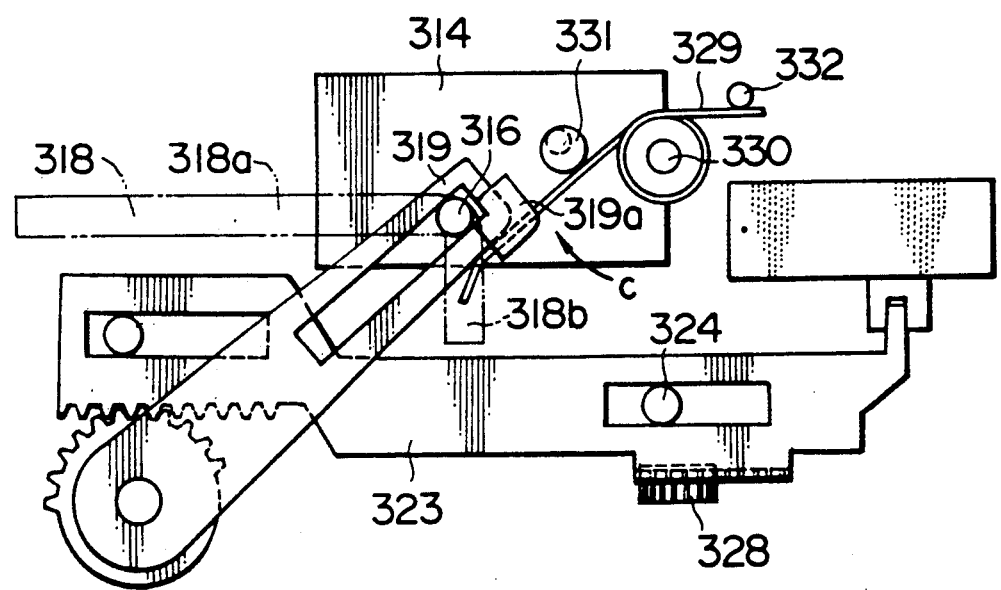
Figure 19:
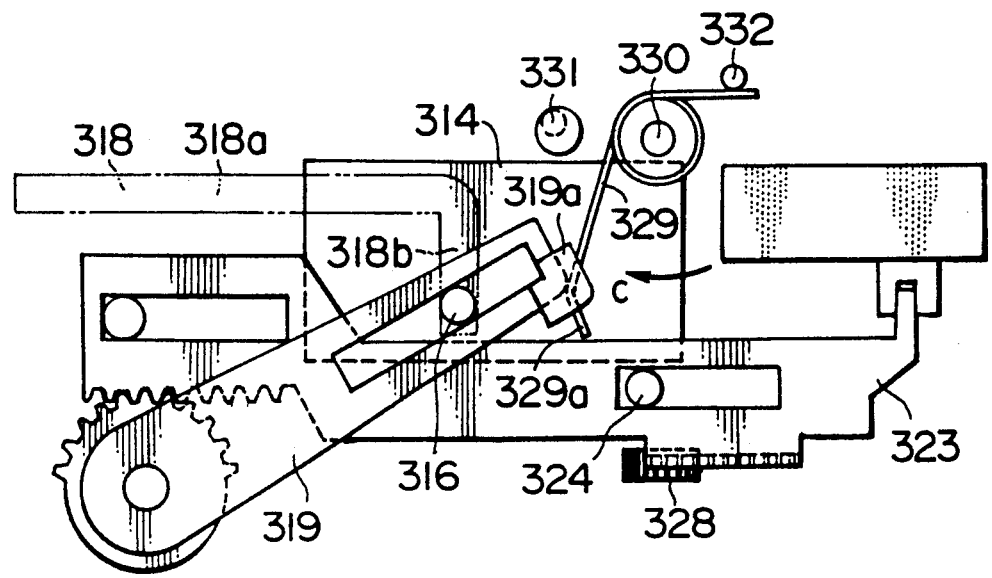

FIGS. 17 to 19 are side views of essential parts of the cassette loading apparatus constructed as described above, for exaplanation of the operation thereof. As the holder driving gear 328 is rotated to cause the rack 323 to move in the direction of the arrow a, the drive arm 319 is rotated in the direction of the arrow b.

FIG. 18 shows a state where the guide pin 316 projected from the side wall 315 of the cassette holder 314 is about to be shifted from the first guide groove portion 318a into the second guide groove portion 318b formed in the side wall member 317. In this case, the drive arm 319 is about to come in contact with the resilient member 329. As the guide pin 316 is further moved in the direction toward the second guide groove portion 318b (that is, toward the second position where recording and reproduction to and from the cassette can be effected), the drive arm 319 comes in contact with the resilient member 329, which condition is being kept till arrival at the second position where the cassette is loaded as shown in FIG. 19. In this case, since the resilient member 329 is imparted with a rotation urging force in the direction of an arrow c opposite to the direction of rotation of the drive arm 319, the moving speed of the cassette holder 314 is reduced before arrival at the second position.

The resilient member 329 is prevented from coming off from the drive arm 319 due to the provision of the guide portion 319a of the drive arm 319 so that it is possible to impart the rotation urging force in the direction of the arrow c without fail.

Usually, when the guide pins 316, 316' of the cassette holder 314 are shifted from the first guide groove portion 318a into the second guide groove portion 318b, the weight of the cassette holder 314 containing the cassette, which has not been applied during the movement along the first guide groove portion 318a, is added in the direction toward the second position of the cassette, with the result that, owing to the backlash of the gears of the driving means constituted by the drive arm 319, 319' and the like, the cassette holder 314 is moved (or rather dropped) abruptly toward the second position of the cassette, thus making a loud noise. However, according to the present embodiment, since the resilient members 329, 329' serve to impart the rotation urging force in the direction opposite to the direction of rotation of the drive arms 319, 319' (as indicated by the arrow c), the moving speed of the cassette holder 314 is reduced before arrival at the second position, thus preventing the abrupt drop and, accordingly, reducing the noise level remarkably.

Figure 20:
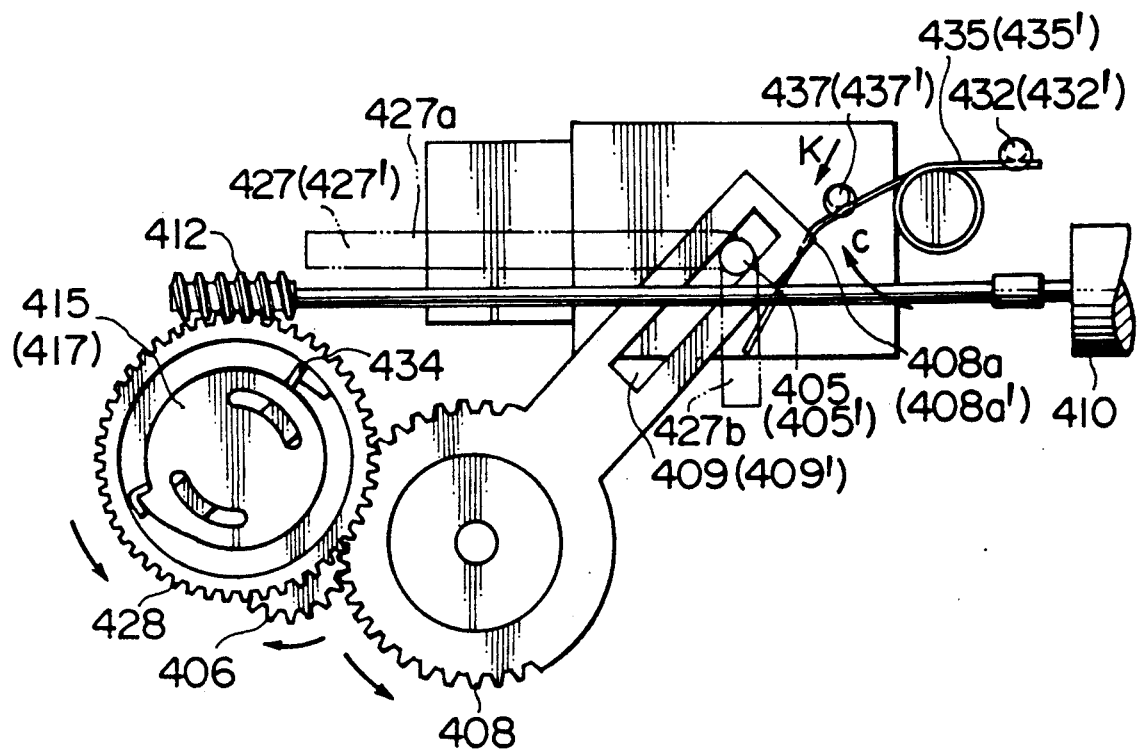
FIG. 20 is a side view illustrating a fourth embodiment of the present invention in which essential parts alone are shown for the sake of brevity.
Figure 23:
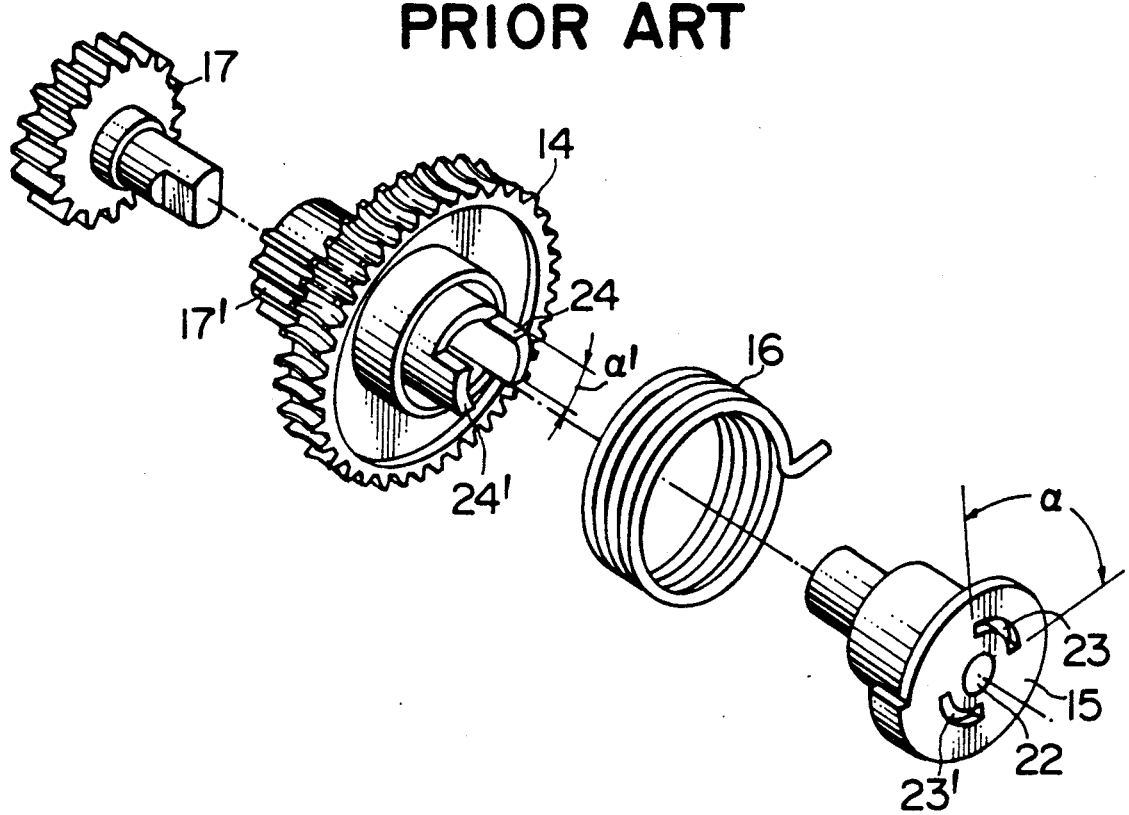
FIGS. 23 and 24 are perspective views illustrating essential parts of the conventional apparatus shown in FIG. 22, the parts being exploded in FIG. 23 while the parts being assembled in FIG. 24.
Figure 24:
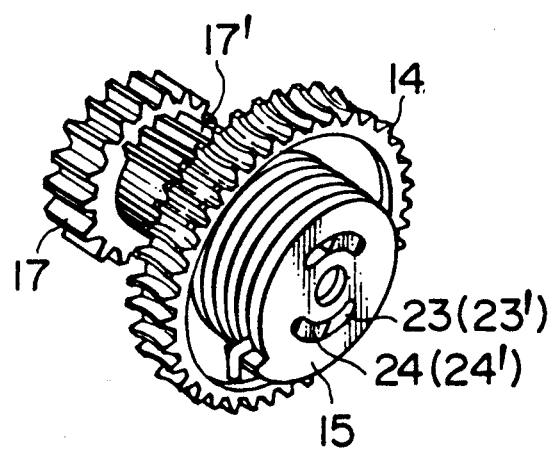
Figure 25:
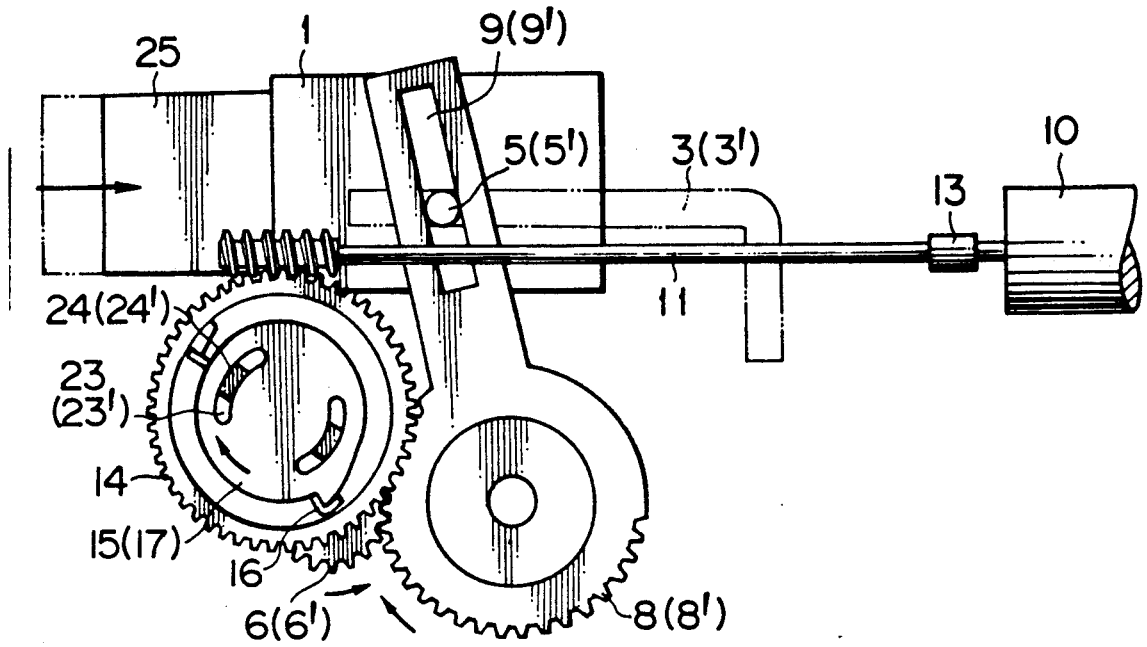
FIGS. 25 to 27 are side views illustrating essential parts of the conventional apparatus shown in FIG. 22.
Figure 26:
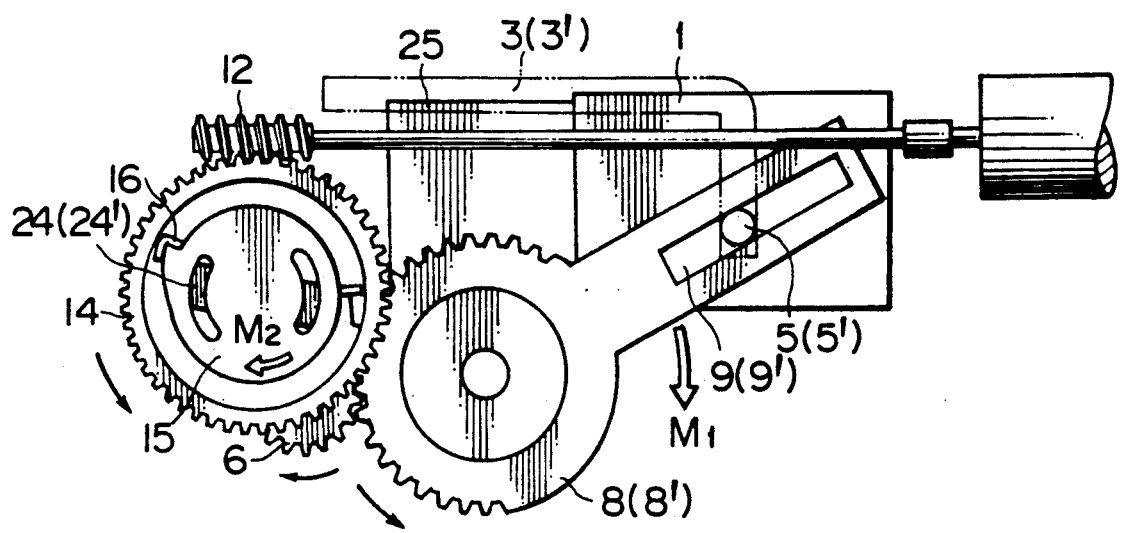
Figure 27:
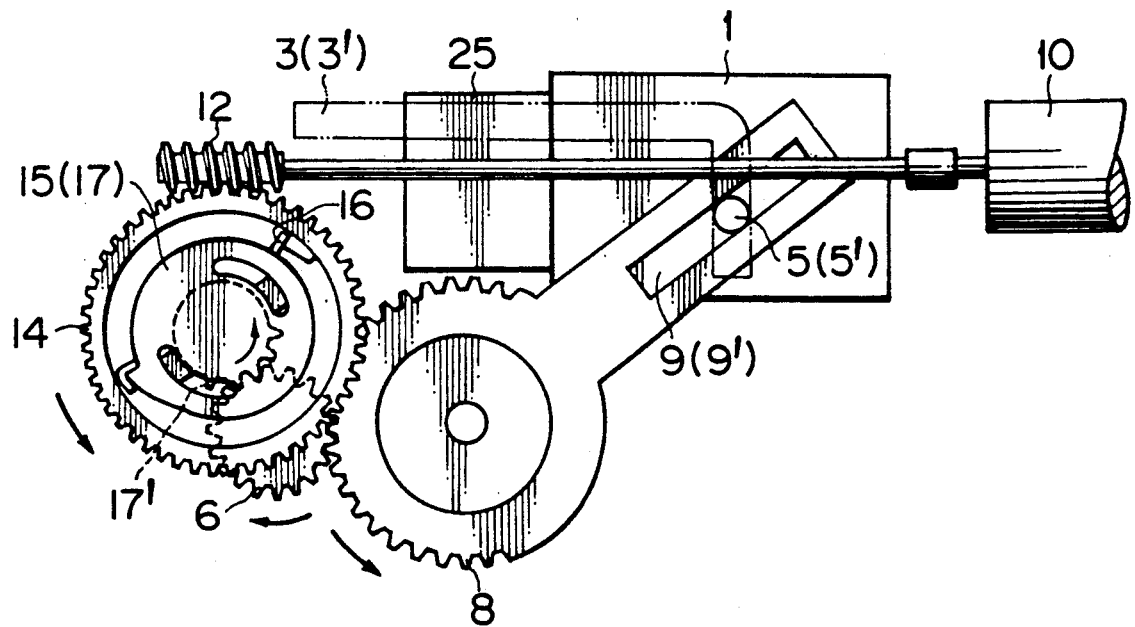

FIG. 20 shows a fourth embodiment of the present invention, in which reference numerals 435 and 435' denote resilient members provided on shaft portions 436, 436' which are projectingly provided on side plates (not shown). Reference numerals 437 and 437' denote stoppers for one ends of the resilient members 435, 435', which stoppers are projected from the side plates. The other ends of the resilient members 435, 435' are engaged with stoppers 432, 432' which are projected from the side plates 426, 426'. The resilient members 435, 435' are normally imparted with a rotation urging force in the direction toward the stoppers 437, 437'.

Reference numerals 435a and 435a' denote bent portions extending continuously from the resilient members 435, 435' so as to prevent the end surfaces of the resilient members 435, 435' from coming in contact with the drive arm 408(408').

Reference numerals 408a and 408a' denote guide members formed integrally with the drive arms 408, 408'. As the guide members 408a, 408a', grooves are formed in the forward ends of the drive arms 408, 408', so that the resilient members 435, 435' are surely guided by the drive arms 408, 408' and, accordingly, are capable of imparting the rotation urging force in the direction of the arrow c without fail while being prevented from coming off from the drive arms 408, 408'.

As has been described above, according to the present invention, by virtue of adoption of a very simple and inexpensive construction, there is caused no deviation in phase between the racks at the time of inserting the cassette even if the user continues to push in the cassette with his hand after the commencement of the cassette loading-in operation, and the cassette is enabled to be inserted smoothly and loaded smoothly and softly as well as ejected smoothly owing to the provision of the supplementary force imparting means.

What is claimed is:

1. A cassette loading apparatus, comprising:
a power source for producing a drive power:
a cassette holder having opposite side walls each having a projection provided thereon, said cassette holder for releasably holding a tape cassette between said side walls;
side plates disposed respectively along said side walls and each including a guide means which is engaged with said projection to guide said cassette holder between a first position where the tape cassette is loaded and unloaded, and a second position where said tape cassette is subjected to reproduction or recording, each of said guide means having a first portion along which the cassette holder is moved in a substantially horizontal direction to an intermediate position substantially directly above said second position and a second portion extending in a substantially vertical direction from said intermediate position to said second position;
drive means for driving said cassette holder to move along said guide means between said first position and said second position;
clutch means including a power output member engaged with said drive means and disposed along one of said side plates to transmit said drive power to said drive means along said side plate, and a power input member disposed along said power output member, said power input member being selectively engaged with said power output member by a resilient means and receiving said drive power transmitted from said power source;
said resilient means engaging said power input member with said power output member such that said power input member is associated with said power output member to transmit said drive power to said power output member, said resilient means storing a resilient force tending to urge said cassette to move from said second position to said first position when said cassette holder is moved from said first position to said second position; and supplemental force imparting means, provided on at least one of said plates, for engaging with said drive means when said projection moves along said second portion of said guide means to apply an assist force to said projection in a direction along which said projection moves from said second position to said intermediate position.

2. A cassette loading apparatus according to claim 1, wherein said power output member has a first engaging portion and said power input member has a second engaging portion engaged with said first engaging portion, said power input member and said power output member being rotated coaxially with each other by action of said resilient means.

3. A cassette loading apparatus according to claim 1, wherein a load resulting from movement of said projection along said second portion of said guide means by said cassette holder containing therein said tape cassette is smaller than the sum of a force applied by said supplemental force imparting means and a force applied by said resilient force of said resilient means.

4. A cassette loading apparatus according to claim 1, wherein said drive means includes at least one drive arm having a gear thereon, and said power output member includes a tooth portion meshed with said gear, said power output member being movable along a guide member provided on one of said side plates in a mutually slidable relation to said power input member by action of said resilient means.

5. A cassette loading apparatus according to claim 4, wherein said supplemental force imparting means is kept in resilient contact with said drive arm during movement of said projection along said second portion of said guide means toward said second position.

6. A cassette loading apparatus according to claim 4, wherein said supplemental force imparting means includes a control lever rotatably provided on at least one of said side plates and a resilient member for imparting a unidirectional turning force to said control lever, whereby a portion of said drive arm comes into contact with a portion of said control lever before arrival of the drive arm at said intermediate position after movement of said cassette holder from said first position so that said resilient member stores said assist force.

7. A cassette loading apparatus according to claim 4, wherein the supplemental force imparting means is constituted by a resilient member which has a bent portion integrally formed at one end thereof so as to be made to shift against a rotation urging applied by a portion of the drive arm before arrival of said drive arm at a terminal end of its stroke of rotative movement for bringing the cassette holder to the second position.

8. A cassette loading apparatus according to claim 4, wherein the drive arm is integrally provided with a guide element so as to prevent the second resilient member comprising part of the supplemental force imparting means from coming off from said drive arm during exertion of a rotation urging force from said resilient member onto said drive arm.

9. A cassette loading apparatus according to claim 8, wherein the guide element has a groove which is formed in the drive arm, said groove serving to retain the resilient member.

* * * * *